(12) United States Patent
Ishida et al.

(10) Patent No.: US 9,752,001 B2
(45) Date of Patent: Sep. 5, 2017

(54) ION CONDUCTIVE FILM, POLYMER ELEMENT, ELECTRONIC DEVICE, CAMERA MODULE, AND IMAGING DEVICE

(71) Applicant: DEXERIALS CORPORATION, Tokyo (JP)

(72) Inventors: Takehisa Ishida, Tokyo (JP); Kousuke Seki, Tokyo (JP); Nobuyuki Nagai, Tokyo (JP); Yusaku Kato, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 15/034,311

(22) PCT Filed: Nov. 19, 2014

(86) PCT No.: PCT/JP2014/080600
§ 371 (c)(1),
(2) Date: May 4, 2016

(87) PCT Pub. No.: WO2015/083545
PCT Pub. Date: Jun. 11, 2015

(65) Prior Publication Data
US 2016/0297940 A1    Oct. 13, 2016

(30) Foreign Application Priority Data

Dec. 2, 2013 (JP) .................................. 2013-249052

(51) Int. Cl.
*C08J 5/22* (2006.01)
*G03B 17/02* (2006.01)
(Continued)

(52) U.S. Cl.
CPC ................. *C08J 5/225* (2013.01); *C08K 3/00* (2013.01); *G02B 7/102* (2013.01); *G03B 3/10* (2013.01);
(Continued)

(58) Field of Classification Search
USPC ........................................................... 396/89
See application file for complete search history.

(56) References Cited

U.S. PATENT DOCUMENTS 6,287,722 B1    9/2001  Barton et al.
6,911,764 B2 *  6/2005  Pelrine .................... F04B 35/00
                                                         310/328

(Continued)

FOREIGN PATENT DOCUMENTS

JP    2002-538252 A    11/2002
JP    2004-047244 A     2/2004
(Continued)

OTHER PUBLICATIONS

Jun. 7, 2016 International Preliminary Report on Patentability dated in International Patent Application No. PCT/JP2014/080600.
(Continued)

*Primary Examiner* — Clayton E Laballe
*Assistant Examiner* — Linda B Smith
(74) *Attorney, Agent, or Firm* — Oliff PLC

(57) ABSTRACT

An ion conductive film contains an ion conductive macromolecular material, a carbon material, and an electrically conductive material different from the carbon material.

20 Claims, 14 Drawing Sheets

(51) Int. Cl.
| | |
|---|---|
| *G02B 7/10* | (2006.01) |
| *H04N 5/225* | (2006.01) |
| *G03B 3/10* | (2006.01) |
| *G03B 5/00* | (2006.01) |
| *C08K 3/00* | (2006.01) |
| *H01G 11/32* | (2013.01) |
| *H01M 2/16* | (2006.01) |
| *H01M 4/583* | (2010.01) |
| *H01M 4/60* | (2006.01) |
| *H01M 4/62* | (2006.01) |

(52) U.S. Cl.
CPC ............... *G03B 5/00* (2013.01); *G03B 17/02* (2013.01); *H01G 11/32* (2013.01); *H01M 2/1673* (2013.01); *H01M 4/583* (2013.01); *H01M 4/60* (2013.01); *H01M 4/624* (2013.01); *H04N 5/2254* (2013.01); *H04N 5/2257* (2013.01); *C08J 2327/24* (2013.01); *G03B 2205/0084* (2013.01)

(56) References Cited

U.S. PATENT DOCUMENTS

| | | | |
|---|---|---|---|
| 7,583,009 B2 | 9/2009 | Nagai et al. | |
| 8,054,566 B2* | 11/2011 | Heim | F04B 43/0054 359/822 |
| 8,310,138 B2* | 11/2012 | Nagai | H01B 1/122 310/330 |
| 8,492,959 B2* | 7/2013 | Kitayama | C09J 9/02 310/324 |
| 8,816,569 B2* | 8/2014 | Suda | F03G 7/005 310/300 |
| 9,065,360 B2* | 6/2015 | Mitsumori | H02N 11/006 |
| 2002/0035903 A1* | 3/2002 | Sato | B65H 35/02 83/13 |
| 2006/0084768 A1* | 4/2006 | Yoshida | C08G 61/123 526/62 |
| 2006/0254903 A1 | 11/2006 | Abe et al. | |
| 2007/0114116 A1 | 5/2007 | Nagai et al. | |
| 2009/0169943 A1 | 7/2009 | Kawanishi | |
| 2010/0135649 A1 | 6/2010 | Nakayama et al. | |
| 2010/0244634 A1 | 9/2010 | Nagai et al. | |
| 2012/0171567 A1* | 7/2012 | Obika | H01M 2/08 429/210 |
| 2012/0228999 A1 | 9/2012 | Yamamoto et al. | |
| 2012/0276462 A1 | 11/2012 | Ishida et al. | |
| 2015/0166348 A1* | 6/2015 | Ikenuma | C01B 31/0438 429/231.95 |

FOREIGN PATENT DOCUMENTS

| | | |
|---|---|---|
| JP | 2004-250771 A | 9/2004 |
| JP | 2004-319153 A | 11/2004 |
| JP | 2006-291162 A | 10/2006 |
| JP | 2007-018844 A | 1/2007 |
| JP | 2007-042590 A | 2/2007 |
| JP | 2007-042595 A | 2/2007 |
| JP | 2007-143300 A | 6/2007 |
| JP | 2008-148452 A | 6/2008 |
| JP | 2008-252958 A | 10/2008 |
| JP | 2008-259381 A | 10/2008 |
| JP | 2010-283927 A | 12/2010 |
| JP | 2012-235585 A | 11/2012 |
| JP | 2013-139573 A | 7/2013 |
| JP | 2013-249052 A | 12/2013 |
| WO | 2011/125616 A1 | 10/2011 |

OTHER PUBLICATIONS

Jan. 20, 2015 Search Report dated in International Patent Application No. PCT/JP2014/080600.
May 12, 2017 Search Report dated in European Patent Application No. 14867051.6.

* cited by examiner

ION CONDUCTIVE FILM, POLYMER ELEMENT, ELECTRONIC DEVICE, CAMERA MODULE, AND IMAGING DEVICE

TECHNICAL FIELD

The present technique relates to an ion conductive film suitable for polymer elements such as polymer actuator elements and polymer sensor elements and to a polymer element, an electronic device, a camera module, and an imaging device that use the ion conductive film.

BACKGROUND ART

In recent years, the functionality of portable electronic devices such as mobile phones, personal computers (PCs), and PDAs (Personal Digital Assistants) is significantly advancing, and portable electronic devices equipped with a camera module and thus having an imaging function are commonly available. In such portable electronic devices, a lens in the camera module is moved in an optical axis direction to achieve focusing and zooming.

A general conventional method for moving the lens within the camera module is to use a voice coil motor or a stepping motor as a driving unit. Recently, from the viewpoint of miniaturization, a camera module using a prescribed actuator element as a driving unit has been developed. Examples of such an actuator element may include a polymer actuator element. The polymer actuator element includes, for example, a pair of electrode layers and an ion conductive macromolecular layer (hereinafter referred to simply as a macromolecular layer) held between the electrode layers. The macromolecular layer contains, for example, water, an ionic liquid, or a high-boiling point organic solvent. In such a polymer actuator element, when an electric field is applied between the pair of electrode layers, ions in the macromolecular layer migrate, and displacement thereby occurs. Therefore, the operating characteristic of the polymer actuator element such as the amount of displacement and the speed of response depend largely on the environment of ionic conduction. The polymer element is used as the polymer actuator element, as described above, and is used also as a polymer sensor element, an electric double layer capacitor, a secondary battery, etc.

The electrode layers of the polymer element are constituted by, for example, carbon particles and an ion conductive resin material (for example, Patent Literature 1).

CITATION LIST

Patent Literature

Patent Literature 1: Japanese Patent Application Laid-Open No. 2007-143300

SUMMARY OF INVENTION

Carbon particles are porous and have a large specific surface area. Therefore, the carbon particles have high ion adsorption ability. From this point of view, the carbon particles are suitable for the electrode layers of a polymer element. However, the electric resistance of the carbon particles is higher than that of other conductive materials such as metal materials. The use of a high-electric resistance material for a polymer element results in deterioration of its characteristics. For example, when carbon particles are used for the electrode layers of a polymer actuator element, the amount of displacement is improved, but the time constant CR during charging becomes large, so that the speed of response is reduced.

Therefore, it is desirable to provide an ion conductive film in which an increase in its electric resistance is restrained while its ion adsorption ability is maintained. It is also desirable to provide a polymer element, an electronic device, a camera module, and an imaging device that can improve their characteristics by use of the above ion conductive film.

An ion conductive film according to one embodiment of the present technique contains an ion conductive macromolecular material, a carbon material, and an electrically conductive material different from the carbon material.

A polymer element according to one embodiment of the present technique includes a pair of electrode layers and a macromolecular layer between the pair of electrode layers, wherein at least one of the pair of electrode layers contains an ion conductive macromolecular material, a carbon material, and an electrically conductive material different from the carbon material.

An electronic device according to one embodiment of the present technique includes a polymer element having a pair of electrode layers and a macromolecular layer between the pair of electrode layers, wherein at least one of the pair of electrode layers contains an ion conductive macromolecular material, a carbon material, and an electrically conductive material different from the carbon material.

A camera module according to one embodiment of the present technique includes a lens and a driving unit that is configured using a polymer element and drives the lens, wherein the polymer element includes a pair of electrode layers and a macromolecular layer between the pair of electrode layers, and wherein at least one of the pair of electrode layers contains an ion conductive macromolecular material, a carbon material, and an electrically conductive material different from the carbon material.

An imaging device according to one embodiment of the present technique includes a lens, an imaging element that acquires an imaging signal of an image formed through the lens, and a driving unit that is configured using a polymer element and drives the lens or the imaging element, wherein the polymer element includes a pair of electrode layers and a macromolecular layer between the pair of electrode layers, and wherein at least one of the pair of electrode layers contains an ion conductive macromolecular material, a carbon material, and an electrically conductive material different from the carbon material.

The ion conductive film in one of the above embodiments of the present technique contains, in addition to the carbon material, the electrically conductive material. Therefore, the electric resistance of this ion conductive film is different from the value of the electric resistance of an ion conductive film that contains only the carbon material as an electrically conductive material. Specifically, the electric resistance can be reduced. In the polymer element, the electronic device, the camera module, and the imaging device in the respective embodiments of the present technique, the ion conductive film in the one embodiment of the present technique is used. Therefore, the value of the electric resistance of their electrode layers changes, as in the ion conductive film, and the electric resistance can be reduced.

The ion conductive film in the one embodiment of the present technique contains the carbon material and also the electrically conductive material. Therefore, while the ion adsorption ability is maintained, an increase in electric resistance can be restrained. In the polymer element, the electronic device, the camera module, and the imaging device in embodiments of the present technique, the ion conductive film in one of the embodiments of the present technique is used. Therefore, the electric resistance of the electrode layers can be made low, and their characteristics can be improved. The effects described above are not necessarily intended to be limited, and any of the effects described in the present disclosure may be achieved.

DESCRIPTION OF EMBODIMENT

An embodiment of the present technique will next be described in detail with reference to the drawings. The description will be given in the following order.

1. Embodiment (polymer element: an example in which a conductive substance has a fibrous shape)
2. Modification 1 (an example in which the conductive substance has a granular shape)
3. Modification 2 (an example in which the conductive substance covers the surfaces of carbon particles)
4. Modification 3 (an example in which metal films in contact with electrode layers are provided)
5. Modification 4 (an example in which a polymer element functions as a secondary battery)
6. Application examples
   Application example 1 (an application example in which polymer elements are applied to an imaging device including a driving unit for driving a lens)
   Application example 2 (an application example in which a polymer element is applied to an imaging device including a driving unit for driving an imaging element)
Other application examples Embodiment Configuration of Polymer Element 1

Figure 1:
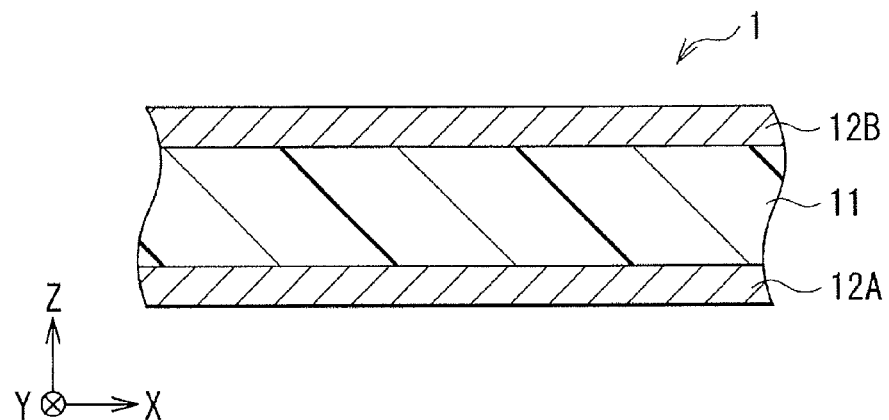
FIG. 1 is a cross-sectional view illustrating the configuration of a polymer element according to one embodiment of the present technique.

FIG. 1 illustrates an example of a cross-sectional configuration (an example of a Z-X cross-sectional configuration) of a polymer element (a polymer element 1) according to one embodiment of the present technique. This polymer element 1 includes a pair of electrode layers 12A and 12B and a macromolecular layer 11 therebetween and is applied to, for example, a polymer actuator element, a polymer sensor element, etc. The planar shape (the planar shape as viewed in a Z direction in FIG. 1) of the macromolecular layer 11 and the electrode layers 12A and 12B is, for example, a rectangular shape (for example, an X direction in FIG. 1 is its lengthwise direction), and its widthwise cross section (for example, a cross section viewed in a Y direction in FIG. 1) deforms into a substantially arc shape. The circumference of the polymer element 1 may be covered with an insulating protective film. The insulating protective film can be constituted by, for example, a highly elastic material (for example, polyurethane).

(Macromolecular Layer 11)

The macromolecular layer 11 is constituted by, for example, an ion conductive macromolecular compound film impregnated with an ionic material. The "ionic material" as used herein refers to any type of ions that can transfer through the macromolecular layer 11. Specifically, the ionic material is meant to encompass: a material containing a polar solvent and hydrogen ions, single metal ions, or these cations and/or anions; and a material, such as an imidazolium salt, which itself is in a liquid form and contains cations and/or anions. Examples of the former may include cations and/or anions solvated with a polar solvent, and examples of the latter may include ionic liquids.

The ionic material may be an organic material or may be an inorganic material, and any type of ionic material can be used. The ionic material may contain cations and may contain anions. In the following description, an ionic material containing cations will be described. Examples of the ionic material containing cations may include ionic materials in various forms such as ionic materials containing single metal ions, ionic materials containing metal ions and water, ionic materials containing organic cations and water, and ionic liquids. Specific examples of the metal ions may include light metal ions such as sodium ions ($Na^+$), potassium ions ($K^+$), lithium ions ($Li^+$), and magnesium ions ($Mg^{2+}$). Examples of the organic cations may include alkyl ammonium ions. In the macromolecular layer 11, the ions contained in the ionic material are present as a hydrate.

Therefore, in the polymer element 1, it is preferable that the entire polymer element 1 be sealed in order to prevent evaporation of water.

An ionic liquid contains cations and anions. This ionic liquid is a so-called ambient temperature molten salt and has flame retardancy and low volatility. Specific examples of the ionic liquid may include imidazolium ring-based compounds, pyridinium ring-based compounds, and aliphatic-based compounds. The ionic material used is preferably an ionic liquid. The use of the macromolecular layer 11 containing a low-volatility ionic liquid allows the polymer element 1 to operate preferably even in a high-temperature environment or in a vacuum.

When a cationic material is used as the ionic material for impregnation, the ion conductive macromolecular compound film used may be a cation exchange resin membrane having a skeleton formed of a fluorocarbon resin or a hydrocarbon. Examples of the cation exchange resin membrane may include a cation exchange resin membrane into which acidic functional groups such as sulfonic (sulfo) groups or carboxyl groups are introduced. Specific examples of the cation exchange resin membrane may include polyethylene membranes having acidic functional groups, polystyrene membranes having acidic functional groups, and fluorocarbon resin membranes having acidic functional groups. Of these, the cation exchange resin membrane is preferably a fluorocarbon resin membrane having sulfonic groups or carboxyl groups, and examples thereof may include Nafion (manufactured by DuPont).

(Electrode layers 12A and 12B)

Figure 2A:
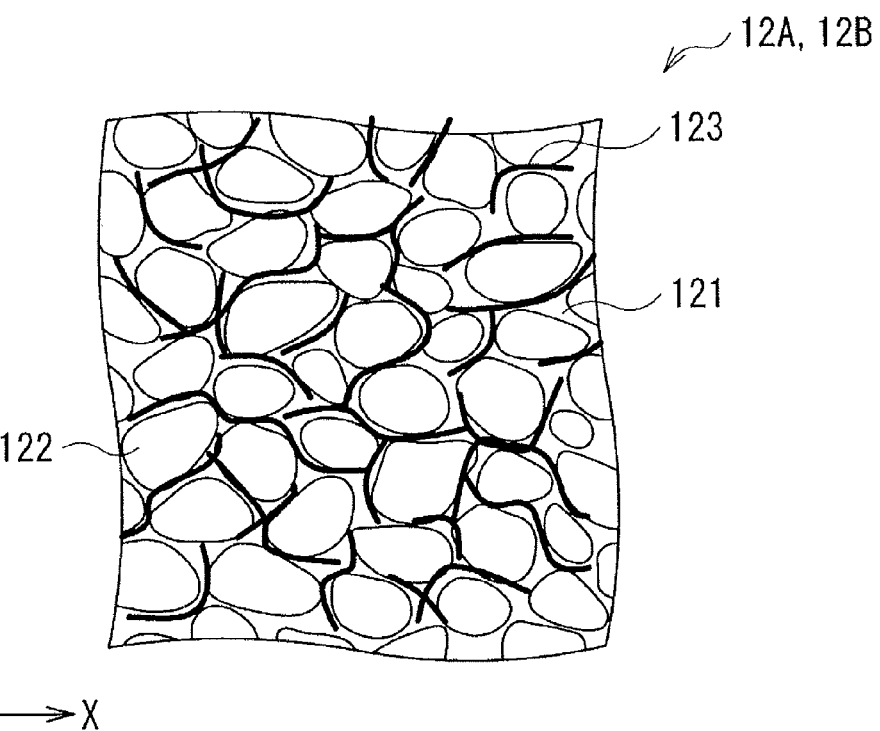
FIG. 2A is a plan view illustrating the structure of an electrode layer shown in FIG. 1.
Figure 2B:
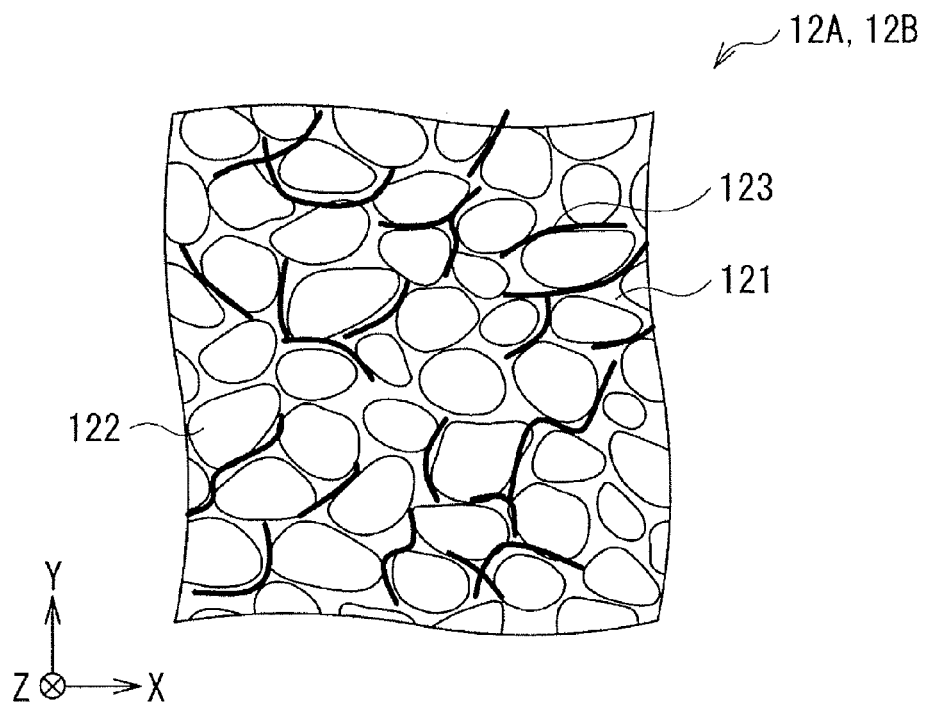
FIG. 2B is a plan view illustrating another example of the electrode layer shown in FIG. 2A.

The electrode layers 12A and 12B (ion conductive films) each include an ion conductive macromolecular material (a macromolecular material 121 in FIG. 2A described later) and an electrically conductive material contained therein. In this embodiment, the electrode layers 12A and 12B contain, as the electrically conductive material, a plurality of carbon particles 122 (a carbon material) and an electrically conductive substance 123 (an electrically conductive material) different in type from the carbon particles 122, as shown in FIGS. 2A and 2B. Although the details will be described later, the use of the carbon particles and also the electrically conductive substance can reduce the electric resistance of the electrode layers 12A and 12B as compared with a case where only the carbon particles are contained in the ion conductive macromolecular material. Preferably, both of the electrode layers 12A and 12B contain the electrically conductive substance 123. However, it is sufficient that the electrically conductive substance 123 be contained in at least one of the electrode layers 12A and 12B.

The macromolecular material 121 used may be the same as a constituent material of the macromolecular layer 11. This macromolecular material 121 allows ions to transfer in the electrode layers 12A and 12B. The carbon particles 122 are porous and have a plurality of pores (pores 122P in FIG. 5B described later). The larger the number of pores is, the larger the surface area of the carbon particles 122 is, and the higher the ion adsorption ability is. The BET specific surface area of the carbon particles 122 is equal to or higher than, for example, 500 $m^2/g$. The pores in the carbon particles 122 are filled with the macromolecular material 121. The macromolecular material 121 is disposed also in spaces between the carbon particles 122, and the carbon particles 122 are bound through the macromolecular material 121. By binding the carbon particles 122 through the macromolecular material 121 to form the electrode layers 12A and 12B as described above, the flexibility of the electrode layers 12A and 12B can be increased. Preferably, the carbon particles 122 are, for example, Ketjen black.

The electrically conductive substance 123 is present in the space between the carbon particles 122 and is distributed in the in-plane and thickness directions of the electrode layers 12A and 12B. The electrically conductive substance 123 has, for example, a fibrous shape. The electrically conductive substance 123 has a diameter of, for example, 100 nm or less and an aspect ratio of 4 or more. When the diameter of the electrically conductive substance 123 is large, its stiffness becomes high, and this may influence the amount of displacement of the polymer element 1. The fibrous electrically conductive substance 123 may extend in a uniform direction or in different directions. For example, application of a high electric field allows the electrically conductive substance 123 to extend in a uniform direction. When the fibrous electrically conductive substance 123 extends uniformly in the thickness direction of the electrode layers 12A and 12B, an increase in the electric resistance of the electrode layers 12A and 12B in their thickness direction can be effectively restrained. In addition, even when the stiffness of the electrically conductive substance 123 is higher than the stiffness of the carbon particles 122, the amount of displacement of the polymer element 1 is less likely to be influenced. The fibrous electrically conductive substance 123 may extend in a uniform direction intersecting sides to be deformed (for example, the long sides of the electrode layers 12A and 12B) and preferably in a uniform direction orthogonal to the sides to be deformed (for example, in a direction along the short sides of the electrode layers 12A and 12B). In this manner the influence of the presence of the electrically conductive substance 123 on the amount of displacement of the polymer element 1 can be reduced.

Preferably, the electric resistivity of the electrically conductive substance 123 is lower than the electric resistivity of the carbon particles 122. More specifically, the electric resistivity of the carbon particles is about 4 $\Omega \cdot m$, and it is preferable that the electric resistivity of the electrically conductive substance 123 be smaller by at least one order of magnitude than the electric resistivity of the carbon particles 122. The electrically conductive substance 123 used may be, for example, a metal material. Particularly, it is preferable to use a corrosion-resistant metal material having a low electric resistance as the electrically conductive substance 123. Specifically, it is preferable to use gold (Au) having an electric resistivity of $2.05 \times 10^{-8}$ $\Omega \cdot m$ or platinum (Pt) having an electric resistivity of $1.04 \times 10^{-7}$ $\Omega \cdot m$. A metal oxide may be used as the electrically conductive substance 123. Any material having an electric resistivity lower than that of the carbon particles 122 may be used as the electrically conductive substance 123. For example, a compound such as an alloy containing carbon atoms, a conductive organic material, etc. may be used. Alternatively, a mixture of two or more materials may be used to form the electrically conductive substance 123.

The electrically conductive substance 123 is present in the electrode layers 12A and 12B at a weight ratio of 0.01 wt % or more and 10 wt % or less and preferably 0.01 wt % or more and 0.1 wt % or less, with the total weight of the carbon particles 122 and the polymer material 121 being 100%. If the concentration of the electrically conductive substance 123 is excessively low, the electric resistance of the electrode layers 12A and 12B tends not to be low. If the concentration of the electrically conductive substance 123 is high, the stiffness of the electrode layers 12A and 12B is influenced, and the amount of displacement of the polymer element 1 may be reduced. In addition, the electrically conductive substance 123 may enter the pores (the pores 122P in FIG. 5B described later) of the carbon particles 122, and this may cause a reduction in the ion adsorption ability of the carbon particles 122. By controlling the concentration of the electrically conductive substance 123 as described above, the electrically conductive substance 123 is allowed to be distributed in spaces between adjacent carbon particles 122 and can be prevented from entering the pores present inside the carbon particles 122. The concentration of the electrically conductive substance 123 may be uniform within the electrode layers 12A and 12B, but the concentration of the electrically conductive substance 123 at one ends of the electrode layers 12A and 12B may be made higher than the concentration of the electrically conductive substance 123 in the other portions. When the polymer element 1 is deformed with the one ends with a high concentration of the electrically conductive substance 123 serving as fixed ends (the right ends in FIG. 3B described later) having the largest contribution to the displacement, the speed of response of the polymer element 1 can be effectively improved.

Adjacent portions of the electrically conductive substance 123 may be in contact with each other to form a network, as shown in FIG. 2A. Or alternatively, adjacent portions of the electrically conductive substance 123 may be separated from each other, as shown in FIG. 2B.

[Method of Producing Polymer Element 1]

The polymer element 1 in this embodiment can be produced, for example, in the following manner.

First, the constituent materials of the electrode layers 12A and 12B are mixed to prepare a coating material. Specifically, for example, a perfluorosulfonic acid polymer such as Nafion (density: 2 g/cm$^3$) is prepared as the polymer material 121. The carbon particles 122 (BET specific surface area: 1,270 m$^2$/g, bulk density: 0.15 g/cm$^3$) are added to the prepared perfluorosulfonic acid polymer such that the weight ratio of the carbon particles 122 is ⅔ (about 8.8 in volume ratio), and they are mixed in pure water. Separately, for example, gold in a fibrous form having a diameter of about 30 nm and a length of about 120 nm to about 4,500 nm is prepared as the electrically conductive substance 123 and dispersed in pure water in advance. The amount, i.e., the weight ratio, of the electrically conductive substance 123 added is 0.01 wt % or more and 10 wt % or less, as described above. Next, the electrically conductive substance 123 dispersed in pure water is added to the mixture of the macromolecular material 121 and the carbon particles 122, and the resultant mixture is stirred. A coating material obtained by mixing the constituent materials of the electrode layers 12A and 12B is applied to both sides of the macromolecular layer 11 and then dried. The polymer element 1 is thereby completed. After the constituent materials of the electrode layers 12A and 12B are mixed, the mixture may be formed into films. The obtained films may be compression-bonded to respective sides of the macromolecular layer 11 to thereby form a macromolecular element 1. The macromolecular layer 11 used is, for example, Nafion.

[Actions and Effects of Polymer Element 1]

(A. Basic Operation when the Polymer Element 1 Functions as a Polymer Actuator Element)

In the polymer element 1 in this embodiment, when a prescribed potential difference is generated between the electrode layers 12A and 12B, the macromolecular layer 11 deforms (warps) on the following principle. Specifically, in this case, the polymer element 1 functions as a polymer actuator element. The operation of the polymer element 1 as the polymer actuator element will next be described.

Figure 3A:
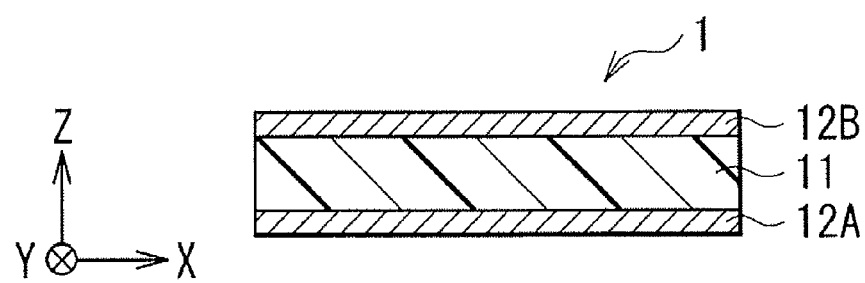
FIG. 3A is a cross-sectional view illustrating the polymer element shown in FIG. 1 when no voltage is applied.
Figure 3B:
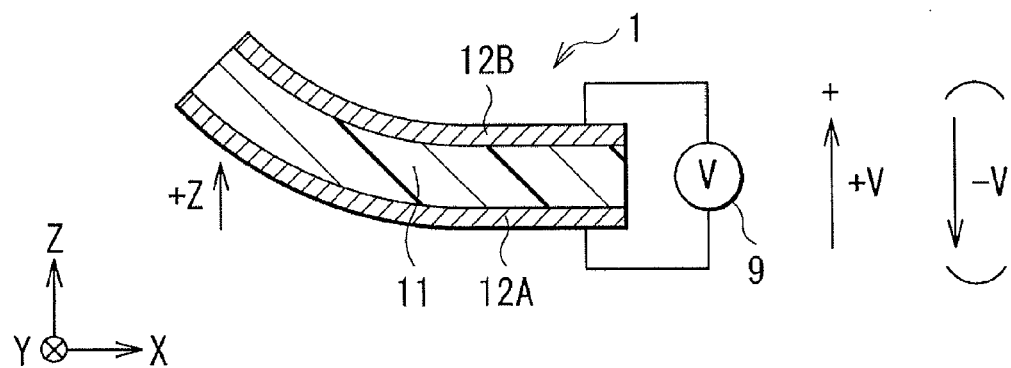
FIG. 3B is a schematic cross-sectional view illustrating the operation of the polymer element shown in FIG. 1 when a voltage is applied.

FIGS. 3A and 3B schematically illustrate the operation of the polymer element 1 (the operation as the polymer actuator element) using cross-sectional views (Z-X cross-sectional views). The operation of the polymer element 1 will next be described for different cases classified according to the type of the ionic material with which the macromolecular layer 11 is impregnated.

First, the operation when the ionic material used contains cations and a polar solvent will be described.

In this case, the polymer element 1 with no voltage applied is not warped and is flat (FIG. 3A) because the cationic material is distributed substantially uniformly within the polymer layer 11. When a voltage functional unit 9 (a voltage supply unit in this case) shown in FIG. 3B is used to achieve a voltage-applied state (to start application of a driving voltage Vd), the polymer element 1 shows the following behavior. For example, when a prescribed driving voltage Vd is applied between the electrode layers 12A and 12B such that, for example, the electrode layer 12A has a negative potential and the electrode layer 12B has a positive potential (see an arrow "+V" in FIG. 3B), the cations solvated with the polar solvent move toward the electrode layer 12A side. In this case, since the anions can hardly move within the macromolecular layer 11, the macromolecular layer 11 extends on its electrode layer 12A side and contracts on its electrode layer 12B side. The polymer element 1 as a whole thereby bends toward the electrode layer 12B side as shown by an arrow "+Z" in FIG. 3B.

Then, when the potential difference between the electrode layers 12A and 12B is removed to achieve a voltage-free state (the application of the driving voltage Vd is stopped), the cationic material (the cations and the polar solvent) unbalancedly distributed on the electrode layer 12A side within the macromolecular layer 11 diffuses, and the polymer element 1 returns to the state shown in FIG. 3A.

When the prescribed driving voltage Vd is applied between the electrode layers 12A and 12B in the voltage-free state shown in FIG. 3A such that the electrode layer 12A has a positive potential and the electrode layer 12B has a negative potential, the cations solvated with the polar solvent move toward the electrode layer 12B side. In this case, the macromolecular layer 11 contracts on its electrode layer 12A side and extends on its electrode layer 12B side. The polymer element 1 as a whole thereby bends toward the electrode layer 12A side (not shown).

Also in this case, when the potential difference between the electrode layers 12A and 12B is removed to achieve a voltage-free state, the cationic material unbalancedly distributed on the electrode layer 12B side within the macromolecular layer 11 diffuses, and the polymer element 1 returns to the state shown in FIG. 3A.

Next, the operation when the ionic material used is an ionic liquid containing liquid cations will be described.

In this case, the ionic liquid is distributed substantially uniformly within the macromolecular layer 11 when no voltage is applied, and the polymer element 1 is planar as shown in FIG. 3A. When the voltage functional unit 9 is used to achieve a voltage-applied state (to start application of the driving voltage Vd), the polymer element 1 shows the following behavior. For example, when a prescribed driving voltage Vd is applied between the electrode layers 12A and 12B such that the electrode layer 12A has a negative potential and the electrode layer 12B has a positive potential (see the arrow "+V" in FIG. 3B), the cations in the ionic liquid move toward the electrode layer 12A side. However, the anions in the ionic liquid cannot move within the macromolecular layer 11, which is a cation exchange membrane. Therefore, the macromolecular layer 11 extends on its electrode layer 12A side and contracts on its electrode layer 12B side. The polymer element 1 as a whole thereby bends toward the electrode layer 12B side as shown by the arrow "+Z" in FIG. 3B.

Then, when the potential difference between the electrode layers 12A and 12B is removed to achieve a voltage-free state (the application of the driving voltage Vd is stopped), the cations unbalancedly distributed on the electrode layer 12A side within the macromolecular layer 11 diffuse, and the polymer element 1 returns to the state shown in FIG. 3A.

When the prescribed driving voltage Vd is applied between the electrode layers 12A and 12B in the voltage-free state shown in FIG. 3A such that the electrode layer 12A has a positive potential and the electrode layer 12B has a negative potential, the cations in the ionic liquid move toward the electrode layer 12B side. In this case, the macromolecular layer 11 contracts on its electrode layer 12A side and extends on its electrode layer 12B side. The polymer element 1 as a whole thereby bends toward the electrode layer 12A side (not shown).

Also in this case, when the potential difference between the electrode layers 12A and 12B is removed to achieve a voltage-free state, the cations unbalancedly distributed on the electrode layer 12B side within the polymer layer 11 diffuse, and the macromolecular element 1 returns to the state shown in FIG. 3A.

(B. Basic Operation when the Macromolecular Element 1 Functions as a Macromolecular Sensor Element)

In the polymer element 1 in this embodiment, when the macromolecular layer 11 deforms (warps) in a direction perpendicular to its plane direction (the z-axis direction in this case), a voltage (an electromotive force) is generated between the electrode layers 12A and 12B on the following principle. Specifically, in this case, the polymer element 1 functions as a polymer sensor element (for example, a bend sensor, a velocity sensor, an acceleration sensor, etc.). The operation of the polymer element 1 will next be described for different cases classified according to the type of the ionic material with which the macromolecular layer 11 is impregnated.

First, the operation when the ionic material used contains cations and a polar solvent will be described.

In this case, for example, when the polymer element 1 itself is free of bending stress caused by an external force or does not move linearly and rotationally and is not subjected to acceleration and angular acceleration, no force due to the bending stress, the acceleration, and the angular acceleration is applied to the polymer element 1. Therefore, the polymer element 1 is not deformed (warped) and is planar (FIG. 3A). In this case, since the cationic material is distributed substantially uniformly within the macromolecular layer 11, no potential difference is generated between the electrode layers 12A and 12B, and the voltage detected in the polymer element 1 is 0 (zero) V.

For example, when the polymer element 1 itself undergoes bending stress or moves linearly or rotationally and is subjected to acceleration or angular acceleration, a force due to the bending stress, the acceleration, or the angular acceleration is applied to the polymer element 1, and the polymer element 1 is thereby deformed (warped) (FIG. 3B).

For example, as shown in FIG. 3B, when the polymer element 1 is deformed in the positive direction along the Z axis (toward the electrode layer 12B side), the macromolecular layer 11 contracts on its electrode layer 12B side and extends on its electrode layer 12A side. Then the cations solvated with the polar solvent move toward the electrode layer 12A side on which internal pressure is low, so that the density of cations becomes high on the electrode layer 12A side and becomes low on the electrode layer 12B side. Therefore, in this case, the potential on the electrode layer 12A side is higher than the potential on the electrode layer 12B side, and a voltage V is thereby generated in the polymer element 1. Specifically, in this case, the voltage functional unit 9 (a voltmeter in this case) connected to the electrode layers 12A and 12B detects a negative voltage (−V), as shown by an arrow "−V" in parentheses in FIG. 3B.

When the polymer element 1 is deformed in the negative direction along the Z axis (toward the electrode layer 12A side), the macromolecular layer 11 contracts on its electrode layer 12A side and extends on its electrode layer 12B side, in contrast to the above case. Then the cations solvated with the polar solvent move toward the electrode layer 12B side on which internal pressure is low, so that the density of cations becomes high on the electrode layer 12B side and becomes low on the electrode layer 12A side. Therefore, in this case, the potential on the electrode layer 12B side is higher than the potential on the electrode layer 12A side, and a voltage V is thereby generated in the polymer element 1. Specifically, in this case, the voltage functional unit 9 (the voltmeter) connected to the electrode layers 12A and 12B detects a positive voltage (+V).

Next, the operation when the ionic material used is an ionic liquid containing liquid cations will be described.

Also in this case, for example, when the polymer element 1 itself does not move linearly and rotationally and is not subjected to acceleration and angular acceleration, the polymer element 1 is not deformed (warped) and is planar (FIG. 3A). In this case, since the ionic liquid is distributed substantially uniformly within the polymer layer 11, no potential difference is generated between the electrode layers 12A and 12B, and the voltage detected in the polymer element 1 is 0 (zero) V.

When the polymer element 1 itself moves, for example, linearly or rotationally and is subjected to acceleration or angular acceleration, a force due to the acceleration or the angular acceleration is applied to the polymer element 1, and the polymer element 1 is thereby deformed (warped) (FIG. 3B).

For example, as shown in FIG. 3B, when the polymer element 1 is deformed in the positive direction along the Z axis (toward the electrode layer 12B side), the macromolecular layer 11 contracts on its electrode layer 12B side and extends on its electrode layer 12A side. When the macromolecular layer 11 is a cation exchange membrane, the cations in the ionic liquid move through the membrane toward the electrode layer 12A side on which internal pressure is low. However, the anions are obstructed by the functional groups in the macromolecular layer 11 and cannot move. Therefore, in this case, the potential on the electrode layer 12A side is higher than the potential on the electrode layer 12B side, and a voltage V is thereby generated in the polymer element 1. Specifically, in this case, the voltage functional unit 9 (the voltmeter in this case) connected to the electrode layers 12A and 12B detects a negative voltage (−V), as shown by the arrow "−V" in parentheses in FIG. 3B.

When the polymer element 1 is deformed in the negative direction along the Z axis (toward the electrode layer 12A side), the macromolecular layer 11 contracts on its electrode layer 12A side and extends on its electrode layer 12B side, in contrast to the above case. Then the cations in the ionic liquid move toward the electrode layer 12B side on which internal pressure is low, because of the same reason as described above. Therefore, in this case, the potential on the electrode layer 12B side is higher than the potential on the electrode layer 12A side, and a voltage V is thereby generated in the polymer element 1. Specifically, in this case, the voltage functional unit 9 (the voltmeter) connected to the electrode layers 12A and 12B detects a positive voltage (+V).

(C. Operation when the Polymer Element 1 Functions as an Electric Double Layer Capacitor)

The polymer element 1 in this embodiment functions also as an electric double layer capacitor. When a prescribed voltage is applied between the electrode layers 12A and 12B, the ionic material with which the macromolecular layer 11 is impregnated moves and is arranged on the surfaces of the electrode layers 12A and 12B. Electric double layers are thereby formed, and charge is accumulated in the electric double layers, so that the polymer element 1 functions as an electric double layer capacitor.

(D. Action of the Electrically Conductive Substance 123 Contained in the Electrode Layers 12A and 12B)

The action of the electrically conductive substance 123 contained in the electrode layers 12A and 12B of the polymer element 1 in this embodiment will be described.

The specific surface area of porous carbon particles (the carbon particles 122) is large, and the carbon particles 122 have high ion adsorption ability. By using these carbon particles for the electrode layers 12A and 12B of the polymer element 1, characteristics resulting from the ion trapping ability of the polymer element 1 are improved.

However, the electric resistance of the carbon particles 122 is higher than that of other conductive materials such as metal materials. When electrode layers having a high electric resistance are used for a polymer element, its characteristics deteriorate. For example, in a polymer actuator element, the time constant CR during charging becomes large, and the speed of response is reduced. It is contemplated that a metal film is deposited on an electrode layer that uses carbon particles in order to reduce electric resistance (for example, Patent Literature 1). With this method, although the electric resistance of the electrode layer in its in-plane direction can be reduced, the electric resistance of the electrode layer in its thickness direction cannot be reduced. In addition, the high-stiffness metal film may cause an increase in the flexural rigidity of the polymer element.

The electrode layers 12A and 12B of the polymer element 1 contain the carbon particles 122 and further contain the electrically conductive substance 123. Therefore, the electric resistance of the electrode layers 12A and 12B can be made lower than that of electrode layers containing only the carbon particles 122 as an electrically conductive material. In addition, the electrically conductive substance 123 is disposed in spaces between the carbon particles 122 and is distributed in both the in-plane and thickness directions of the electrode layers 12A and 12B, so that the electric resistance of the electrode layers 12A and 12B can be reduced in both the in-plane and thickness directions. It was actually confirmed that, in electrode layers 12A and 12B containing gold as the electrically conductive substance 123, their electric resistance was low in both the in-plane and thickness directions of the electrode layers 12A and 12B. In addition, when the electrically conductive substance 123 is distributed in the electrode layers 12A and 12B, an increase in flexural rigidity does not occur in the polymer element 1. Therefore, the electrically conductive substance 123 is not a cause of obstruction to the deformation of the polymer element 1. When the polymer element 1 functions as an electric double layer capacitor, its electric double layer capacity becomes high.

The reason that the addition of the electrically conductive substance 123 reduces the electric resistance of the electrode layers 12A and 12B may be as follows. The electrically conductive substance 123 may bridge the carbon particles 122 spaced apart from each other, and this allows a larger number of carbon particles 122 to form current paths. Also, the electrically conductive substance 123 may intervene between adjacent carbon particles 122, and this is equivalent to that the contact resistance between the carbon particles 122 is reduced.

As described above, in this embodiment, the electrode layers 12A and 12B contain the carbon particles 122 and also the electrically conductive substance 123, and this allows an increase in electric resistance to be restrained while the ion adsorption ability possessed by the carbon particles 122 is maintained. Therefore, in the polymer element 1, the electric resistance of the electrode layers 12A and 12B is low, and characteristics such as the speed of response and capacity can be improved.

When the electrically conductive substance 123 used is in fiber form, the electrically conductive substance 123 enters spaces between the carbon particles 122 and can therefore be easily distributed in the electrode layers 12A and 12B. Therefore, the electric resistance of the electrode layers 12A and 12B can be effectively reduced.

Modifications of the above embodiment will next be described. The same components as those in the above embodiment will be denoted by the same reference numerals, and their descriptions will be appropriately omitted.

<Modification 1>

Figure 4:
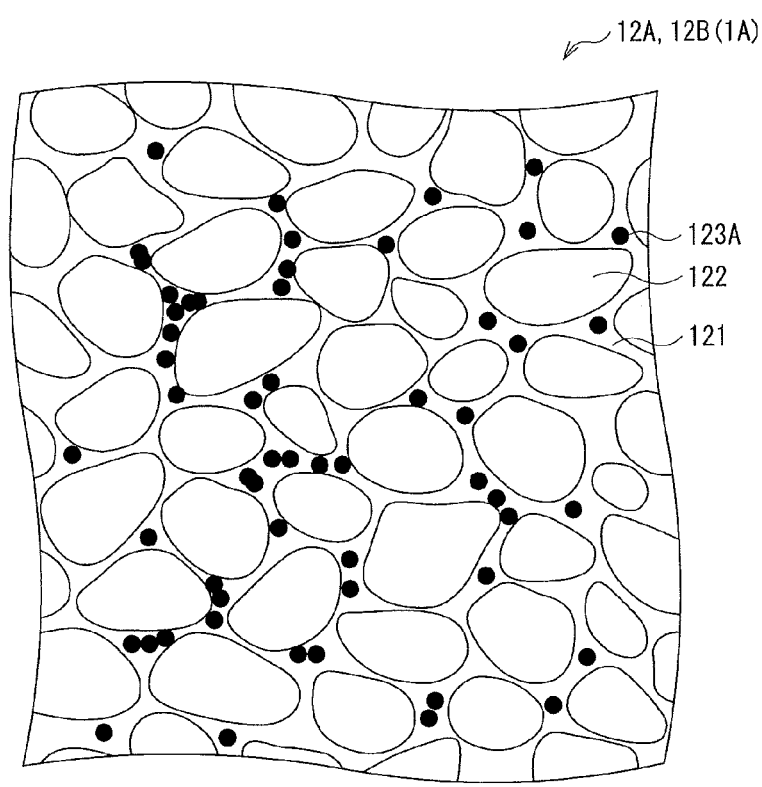
FIG. 4 is a plan view illustrating the structure of an electrode layer of a polymer element in modification 1.

FIG. 4 illustrates the planar structure of electrode layers 12A and 12B in a polymer element (a polymer element 1A) according to modification 1. These electrode layers 12A and 12B include a granular electrically conductive substance (an electrically conductive substance 123A). Except for this, the polymer element 1A has the same configuration as the polymer element 1 in the above embodiment, and the actions and effects of the polymer element 1A are the same as those of the polymer element 1.

The electrically conductive substance 123A is, for example, substantially spherical and has a diameter of, for example, 1 nm to 10 μm. The electrically conductive substance 123A used may be a metal material such as gold or platinum, as is the electrically conductive substance 123. In the macromolecular material 121, the electrically conductive substance 123A is disposed in spaces between the carbon particles 122 and distributed in the in-plane and thickness directions of the electrode layers 12A and 12B. Also when such granular electrically conductive substance 123A is contained in the electrode layers 12A and 12B, an increase in the electric resistance of the electrode layers 12A and 12B can be restrained.

<Modification 2>

Figure 5A:
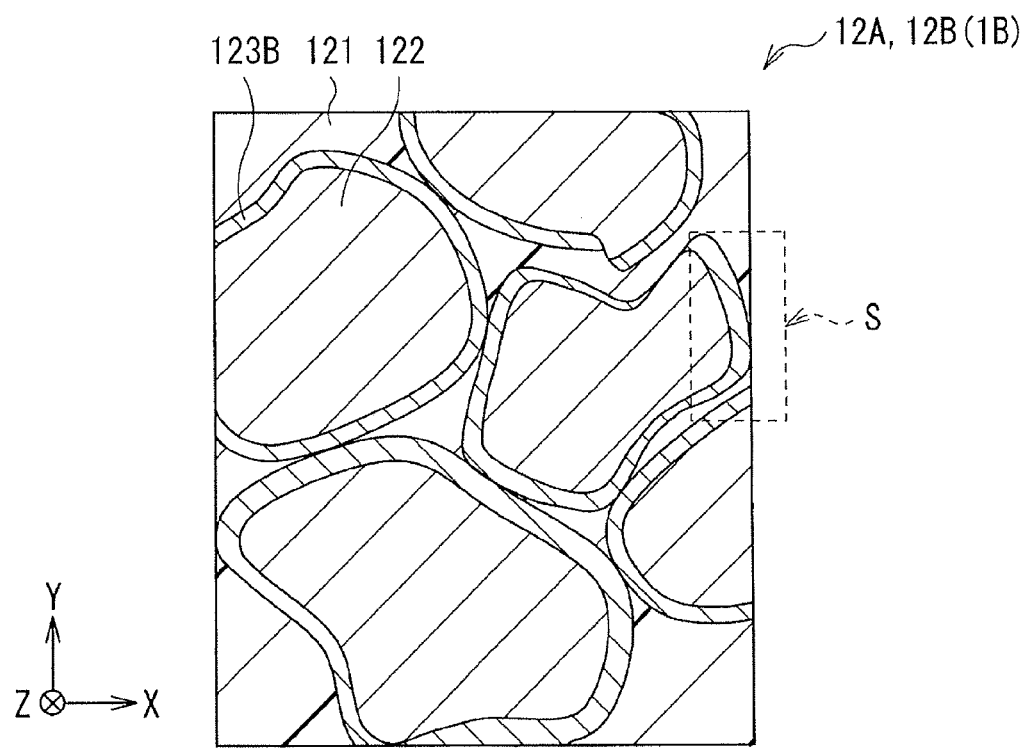
FIG. 5A is a cross-sectional view illustrating the structure of an electrode layer of a polymer element in modification 2.

FIG. 5A illustrates a cross-sectional structure of electrode layers 12A and 12B in a polymer element (a polymer element 1B) according to modification 2. In these electrode layers 12A and 12B, an electrically conductive substance (an electrically conductive substance 123B) is formed into a film shape and covers the entire surfaces of the carbon particles 122 externally (from the side toward the spaces between the carbon particles 122). Except for this, the polymer element 1B has the same configuration as the polymer element 1 in the above embodiment, and the actions and effects of the polymer element 1B are the same as those of the polymer element 1.

Figure 5B:
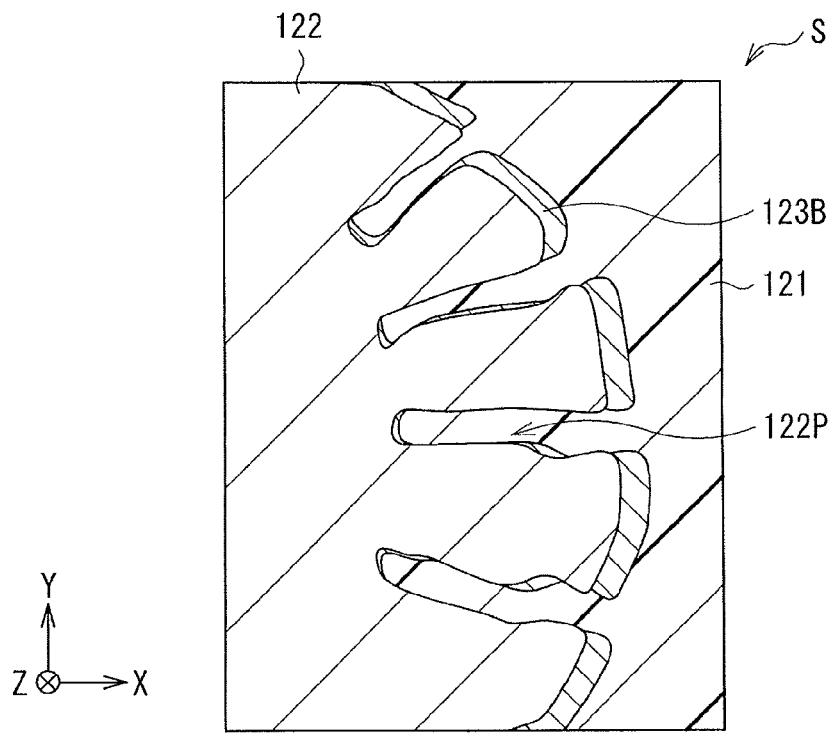
FIG. 5B is a partial enlarged view of FIG. 5A.

FIG. 5B is an enlarged view of an area S surrounded by a broken line in FIG. 5A. Preferably, as shown in the figure, the electrically conductive substance 123B covers the carbon particles 122 while the pores 122P of the carbon particles 122 remain uncovered. The electrically conductive substance 123B is constituted by a metal material such as gold or platinum, and its thickness is, for example, 1 nm to 50 nm. When the thickness of the electrically conductive substance 123B is as described above, the pores 122P (diameter: 2 nm to 50 nm) that contribute to adsorption of ions can be prevented from being clogged with the electrically conductive substance 123B.

The electrically conductive substance 123B can be formed using, for example, a polygonal-barrel sputtering method (see, for example, Japanese Patent Application Laid-Open No. 2004-250771). Specifically, the carbon particles 122 are placed in a polygonal columnar barrel, and sputtering is performed using the constituent material of the electrically conductive substance 123B while the barrel is rotated. In this case, films of the electrically conductive substance 123B are deposited on the surfaces of the carbon particles 122 falling inside the barrel regularly. The electrode layers 12A and 12B are formed by mixing the carbon particles 122 covered with the electrically conductive substance 123B into the macromolecular material 121. Also when the electrically conductive substance 123A is disposed on the surfaces of the carbon particles 122 as described above, an increase in the electric resistance of the electrode layers 12A and 12B can be restrained.

<Modification 3>

Figure 6:
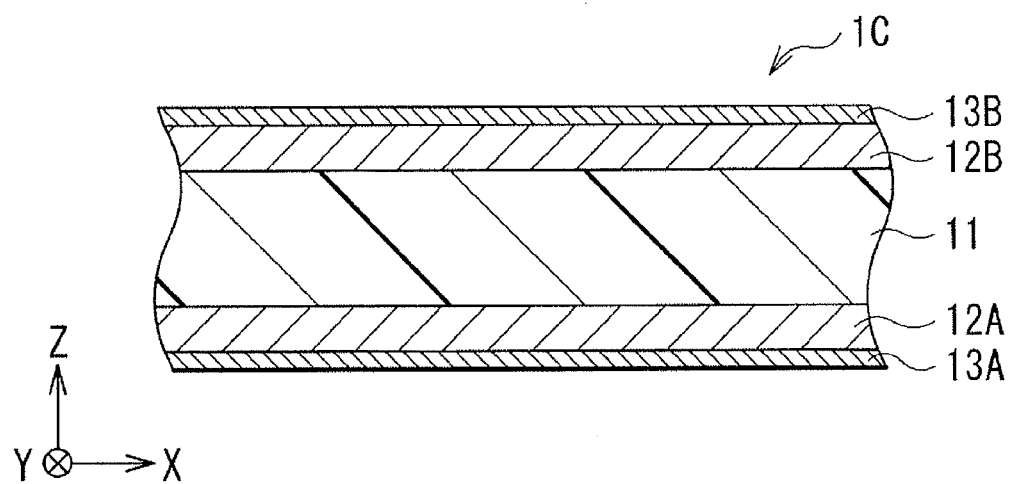
FIG. 6 is a cross-sectional view illustrating the configuration of a polymer element in modification 3.

FIG. 6 illustrates the cross-sectional configuration of a polymer element (a polymer element 1C) according to modification 3. This polymer element 1C includes a metal layer 13A on a surface of the electrode layer 12A that is opposite to the macromolecular layer 11 and a metal layer 13B on a surface of the electrode layer 12B that is opposite to the macromolecular layer 11. Except for this, the macromolecular element 1C has the same configuration as the macromolecular element 1 in the above embodiment, and the actions and effects of the macromolecular element 1C are the same as those of the macromolecular element 1.

The polymer element 1C includes, in the following order, the metal layer 13A, the electrode layer 12A, the macromolecular layer 11, the electrode layer 12B, and the metal layer 13B. By stacking the metal layers 13A and 13B on the electrode layers 12A and 12B, the values of the potentials of the electrode layers 12A and 12B in their in-plane directions become more uniform, and better deformation performance is achieved. Examples of the constituent material of the metal layers 13A and 13B may include gold and platinum. The metal layers 13A and 13B can have any thickness, but it is preferable that the thickness be such that the metal layers 13A and 13B have no influence on the displacement of the polymer element 1C. In the polymer element 1C, the electrode layers 12A and 12B contain the electrically conductive substance 123 (or the electrically conductive substance 123A or 123B). Therefore, even when the metal layers 13A and 13B are thin, the electric resistance can be reduced sufficiently. In this case, bending deformation is not inhibited as compared with the case where the electrode layers contain no electrically conductive substance. The thickness of the metal layers 13A and 13B is, for example, 50 nm or less. Preferably, the metal layers 13A and 13B are continuous films so that the potentials of the electrode layers 12A and 12B are uniform. Examples of the method of forming these metal layers 13A and 13B may include a plating method, a vapor deposition method, and a sputtering method. The metal layers 13A and 13B may be deposited on substrates in advance, and then these metal layers 13A and 13B may be transferred from the substrates to the electrode layers 12A and 12B.

<Modification 4>

Figure 7:
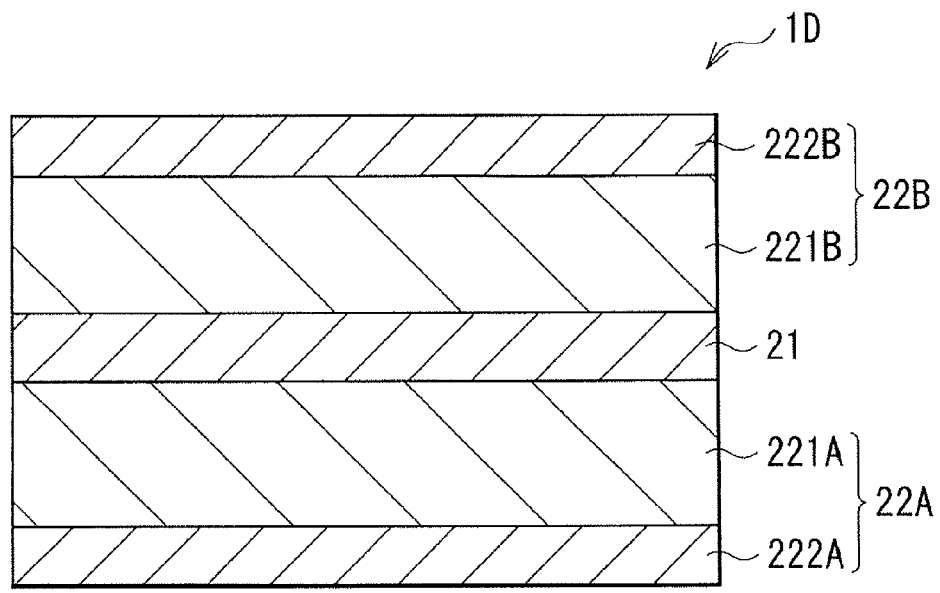
FIG. 7 is a cross-sectional view illustrating the configuration of a polymer element in modification 4.

FIG. 7 illustrates the cross-sectional configuration of a polymer element (a polymer element 1D) according to modification 4. This polymer element 1D includes a positive electrode 22A and a negative electrode 22B disposed through a and functions as, for example, a lithium ion secondary battery. Except for this, the polymer element 1D has the same configuration as the polymer element 1 in the above embodiment, and the actions and effects of the polymer element 1D are the same as those of the polymer element 1.

The separator 21 is provided to separate the positive electrode 22A and the negative electrode 22B from each other to thereby prevent a current short circuit due to contact therebetween. This separator 21 allows ions to pass therethrough between the positive electrode 22A and the negative electrode 22B. The constituent material of the separator 21 used may be the same as the constituent material of the macromolecular layer 11 of the polymer element 1. A gel-like macromolecular material containing an electrolytic solution may be used for the separator 21, or a porous film such as a polytetrafluoroethylene, polypropylene, or polyethylene film may be used.

The separator 21 is impregnated with an electrolytic solution. This electrolytic solution is prepared by dissolving an electrolyte salt in a solvent. If necessary, the electrolytic solution may contain other materials such as various additives. The solvent of the electrolyte is, for example, a nonaqueous solvent such as an organic solvent, and specific examples of the solvent may include ethylene carbonate, propylene carbonate, dimethyl carbonate, diethyl carbonate, and ethyl methyl carbonate. A mixture of two or more types of solvents may be used for the electrolytic solution. The electrolyte salt in the electrolytic solution is one type or two or more types of light-metal salts such as lithium salts. Preferably, the lithium salt is, for example, one type or two or more types of lithium hexafluorophosphate ($LiPF_6$), lithium tetrafluoroborate ($LiBF_4$), lithium perchlorate ($LiClO_4$), and lithium hexafluoroarsenate ($LiAsF_6$). Preferably, the content of the electrolyte salt in the solvent is 0.3 mol/kg or more and 3.0 mol/kg or less.

The positive electrode 22A includes a positive electrode active material layer 221A and a positive electrode current collector 222A, and the positive electrode active material layer 221A and the positive electrode current collector 222A are arranged in this order from a position close to the separator 21. The positive electrode active material layer 221A contains a positive electrode active material such as lithium cobaltate ($Li_xCoO_2$), and the positive electrode current collector 222A is constituted by a metal material such as aluminum.

The negative electrode 22B includes a negative electrode active material layer 221B and a negative electrode current collector 222B, and the negative electrode active material layer 221B and the negative electrode current collector 222B are arranged in this order from a position close to the separator 21. In the polymer element 1D, the negative electrode active material layer 221B contains, in an ion conductive macromolecular material (the macromolecular material 121 in FIG. 2A), carbon particles (the carbon particles 122 in FIG. 2A) and an electrically conductive substance (the electrically conductive substance 123 in FIG. 2A) different from the carbon particles. The electrically conductive substance is present in spaces between the carbon particles. In this case, an increase in the electric resistance of the negative electrode 22B can be restrained as compared with the case where only the carbon particles are contained as an electrically conductive material. The negative electrode current collector 222B is constituted by a metal material such as copper (Cu), nickel (Ni), and stainless steel.

In the polymer element 1D, for example, lithium ions are released from the positive electrode 22A during charging and then occluded in the negative electrode 22B through the electrolytic solution with which the separator 21 is impregnated. During discharging, for example, lithium ions are released from the negative electrode 22B and then occluded in the positive electrode 22A through the electrolytic solution with which the separator 21 is impregnated. In this case, since the negative electrode 22B (the negative electrode active material layer 221B) contains the carbon particles and also the electrically conductive substance, an increase in electric resistance can be restrained while the ion adsorption ability possessed by the carbon particles is maintained. Therefore, in the polymer element 1D, the electric resistance of the negative electrode 22B is low, and charge-discharge characteristics can be improved.

APPLICATION EXAMPLES

Next, application examples (examples of application to imaging devices: application examples 1 and 2) of the polymer elements according to the above embodiment and modifications will be described.

Application Example 1

Configuration of Mobile Phone 8

Figure 8:
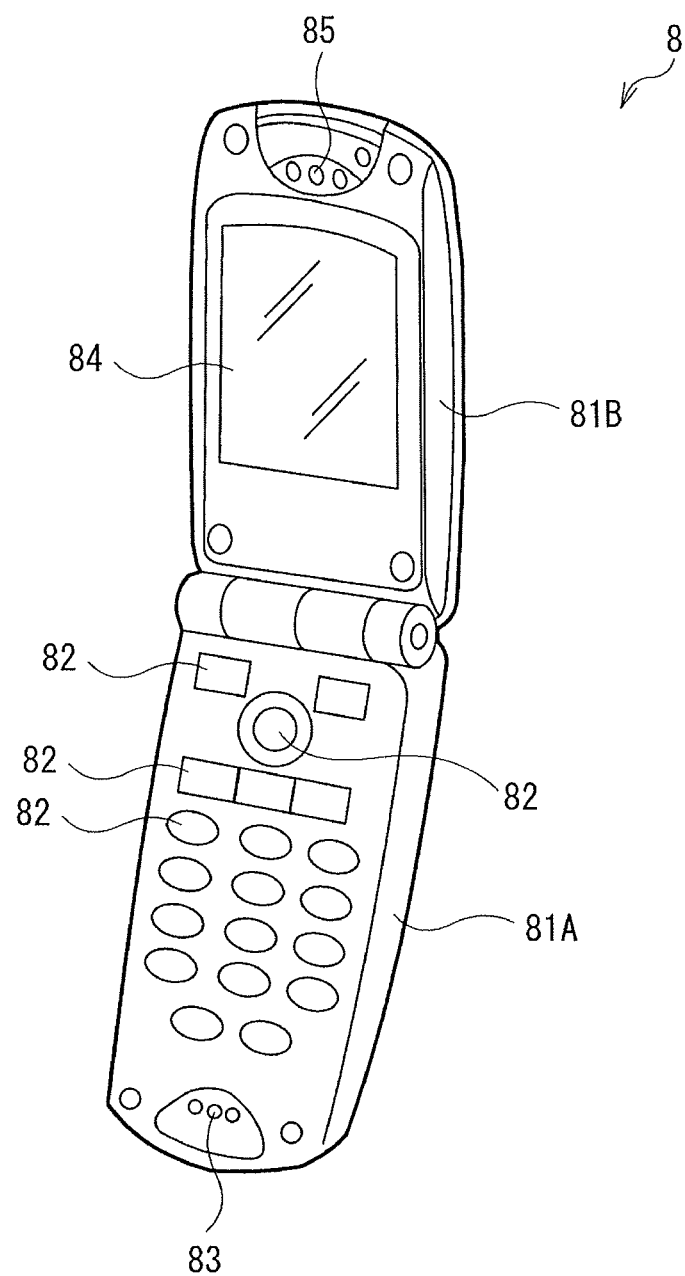
FIG. 8 is a perspective view illustrating an exemplary configuration of an electronic device to which the polymer element shown in FIG. 1 etc. is applied.
Figure 9:
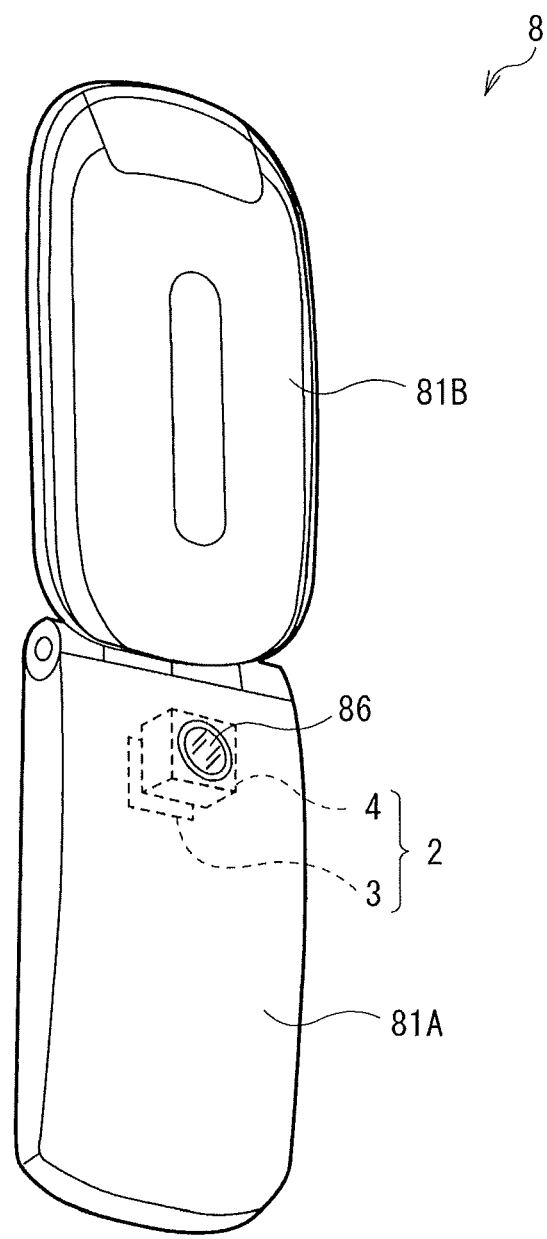
FIG. 9 is a perspective view illustrating the electronic device shown in FIG. 8 and viewed from a different direction.

FIGS. 8 and 9 are perspective views illustrating a schematic configuration of a mobile phone (a mobile phone 8) with an imaging function, which is an example of an electronic device provided with the imaging device according to application example 1 of the polymer elements in the above embodiment etc. In this mobile phone 8, two casings 81A and 81B are connected in a foldable manner to each other through an unillustrated hinge mechanism.

As shown in FIG. 8, a plurality of various function keys 82 are arranged on one side of the casing 81A, and a microphone 83 is disposed in a lower end portion of the casing 81A. The function keys 82 are used to input information in response to a prescribed operation by the user. The microphone 83 is used to input the voice of the user during, for example, a phone call.

As shown in FIG. 8, a display unit 84 that uses a liquid crystal display panel etc. is disposed on one side of the casing 81B, and a speaker 85 is disposed in an upper end portion of the casing 81B. Various types of data such as signal reception state, a remaining battery life, the phone number of the other party of the phone call, details of data registered in a phone book (the phone number, name, etc. of the other party), outgoing call history, and incoming call history are displayed on the display unit 84. The speaker 85 is used to output, for example, the voice of the other party during, for example, the phone call.

As shown in FIG. 9, a glass cover 86 is disposed on the other side of the casing 81A, and an imaging device 2 is disposed at a position inside the casing 81A that corresponds to the position of the glass cover 86. This imaging device 2 includes a camera module 4 disposed on an object side (toward the glass cover 86 side) and an imaging element 3 disposed on an image side (the inner side of the casing 81A). The imaging element 3 is an element for acquiring an imaging signal of an image formed through a lens (a lens 40 described later) in the camera module 4. This imaging element 3 includes an image sensor equipped with, for example, a CCD (Charge Coupled Device) or a CMOS (Complementary Metal Oxide Semiconductor).

(Configuration of Imaging Device 2)

Figure 10:
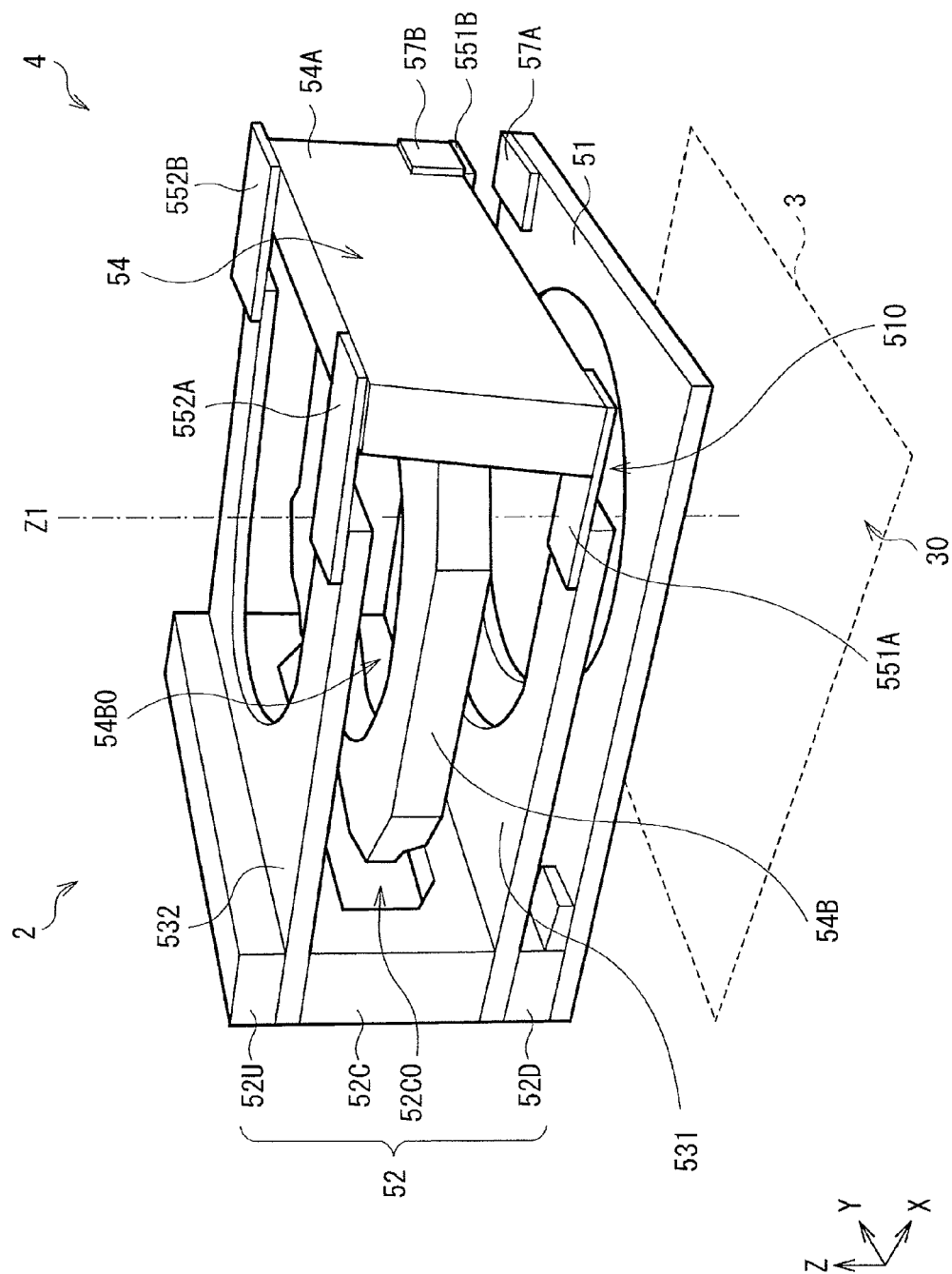
FIG. 10 is a perspective view illustrating the configuration of a main portion of an imaging device shown in FIG. 9.
Figure 11:
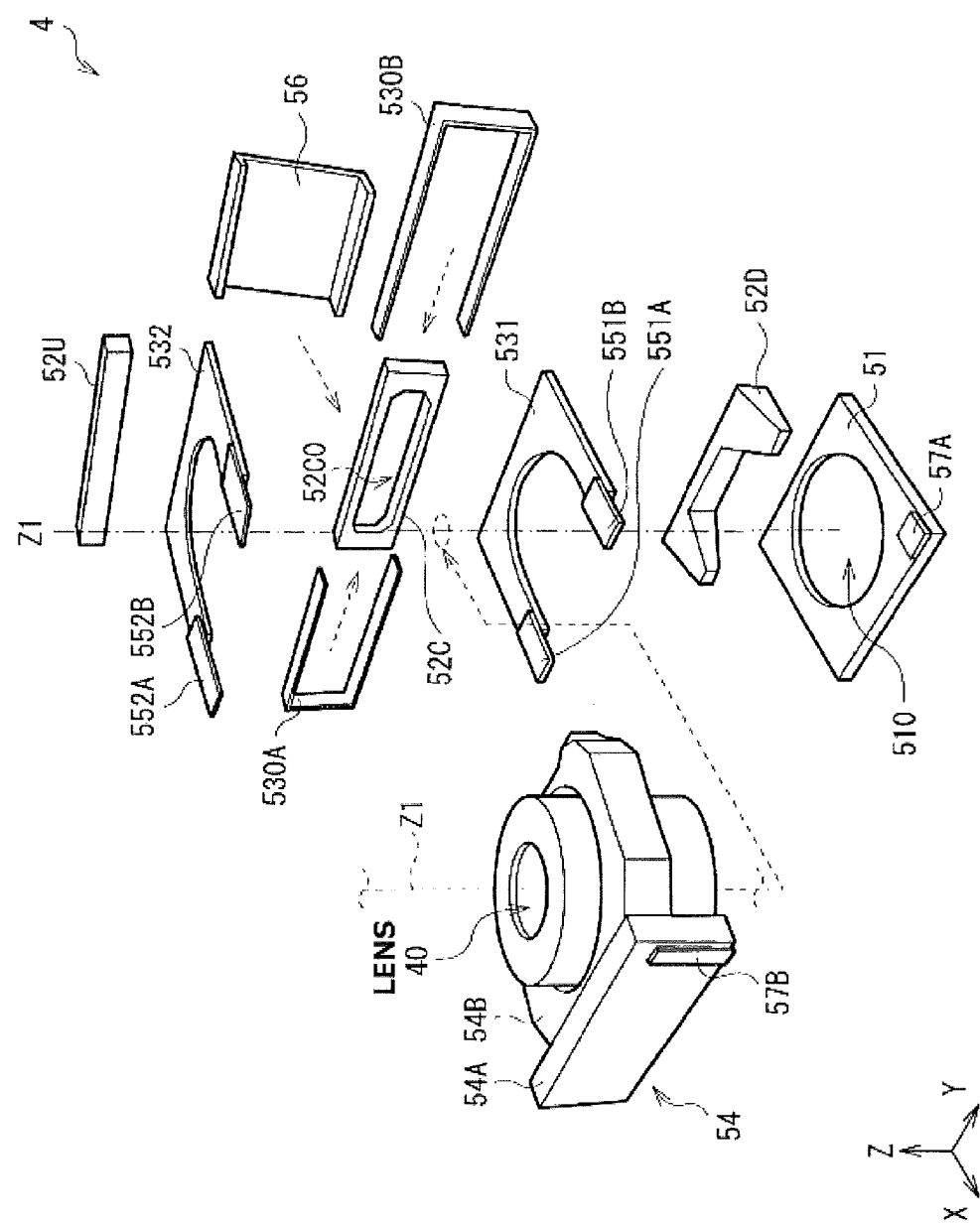
FIG. 11 is an exploded perspective view illustrating a camera module shown in FIG. 10.

FIG. 10 illustrates a perspective view of an exemplary schematic configuration of the imaging device 2, and FIG. 11 illustrates an exploded perspective view of the configuration of the camera module 4 in the imaging device 2.

The camera module 4 includes a support member 51, a polymer actuator element 531, a lens holding member 54, a lens 40, and a polymer actuator element 532, which are arranged in this order along an optical axis Z1 from the image side (the side toward an imaging surface 30 of the imaging element 3) to the object side (in the positive direction of the Z axis). These polymer actuator elements 531 and 532 are constituted by any of the above-described polymer elements 1, 1A, 1B, and 1C. In FIG. 10, the illustration of the lens 40 is omitted. The camera module 4 further includes a fixing member 52, connecting members 551A, 551B, 552A, and 552B, fixed electrodes 530A and 530B, a holding member 56, and Hall elements 57A and 57B. These components of the camera module 4 except for the lens 40 correspond to one specific example of a "driving unit for driving a lens (a lens driving unit)" in the present technique.

The support member 51 is a base member (substrate) for supporting the entire camera module 4.

The fixing member 52 is a member for fixing one ends of the polymer actuator elements 531 and 532. The fixing member 52 includes three members, i.e., a lower fixing member 52D, a center (middle) fixing member 52C, and an upper fixing member 52U, which are arranged from the image side (the lower side in FIGS. 10 and 11) toward the object side (the upper side). The one end of the polymer actuator element 531 and one ends of the fixed electrodes 530A and 530B are each disposed and held between the lower fixing member 52D and the center fixing member 52C. The one end of the polymer actuator element 532 and the other ends of the fixed electrodes 530A and 530B are disposed and held between the center fixing member 52C and the upper fixing member 52U. Among these fixing members, the center fixing member 52C has an opening 52C0 formed so that part of the lens holding member 54 (part of a holding member 54B described later) is inserted thereinto. This allows the part of the lens holding member 54 to move within the opening 52C0, and the space inside the camera module 4 can be effectively used, so that the camera module 4 can be reduced in size.

The fixed electrodes 530A and 530B are electrodes for supplying a driving voltage Vd (FIGS. 12A and 12B described later) from a voltage supply unit 59 described later to electrode layers (any of the electrode layers 12A, 12B, 22A, and 22B described above) of the polymer actuator elements 531 and 532. These fixed electrodes 530A and 530B are formed of, for example, gold (Au) or a metal plated with gold and have a U-shape. Therefore, each of the fixed electrodes 530A and 530B holds the upper and lower sides (the two side surfaces along the Z axis) of the center fixing member 52C, so that the same voltage can be applied in parallel to the pair of polymer actuator elements 531 and 532 using a small number of wiring members. When the fixed electrodes 530A and 530B are formed of a metal material plated with gold, deterioration of contact resistance due to surface corrosion etc. can be prevented.

The lens holding member 54 is a member for holding the lens 40 and is formed of a hard resin material such as a liquid crystal polymer. The lens holding member 54 includes: an annular holding member 54B that holds the lens 40 and is disposed such that its center is located on the optical axis Z1; and a connection section 54A that supports the holding member 54B and connects the holding member 54B to the connecting members 551A, 551B, 552A, and 552B described later. The holding member 54B is disposed between driving surfaces, described later, of the pair of polymer actuator elements 531 and 532.

The polymer actuator elements 531 and 532 each have a driving surface orthogonal to the optical axis Z1 of the lens 40 (a driving surface in the X-Y plane) and are disposed such that the driving surfaces face each other along the optical axis Z1. The polymer actuator elements 531 and 532 are used to drive the lens holding member 54 (and the lens 40) along the optical axis Z1 through the connecting members 551A, 551B, 552A, and 552B described later.

The connecting members 551A, 551B, 552A, and 552B are members for joining (connecting) the other ends of the polymer actuator elements 531 and 532 to ends of the connection section 54A. Specifically, the connecting members 551A and 551B connect a lower end portion of the connection section 54A to the other ends of the polymer actuator element 531, and the connecting members 552A and 552B connect an upper end portion of the connection section 54A to the other ends of the polymer actuator element 532. These connecting members 551A, 551B, 552A, and 552B are each formed from a flexible film such as a polyimide film and preferably from a soft material having stiffness (flexural rigidity) equivalent to or less than (preferably equal to or less than) the polymer actuator elements 531 and 532. This generates a degree of freedom that allows the connecting members 551A, 551B, 552A, and 552B to bend in a direction opposite to the bending direction of the polymer actuator elements 531 and 532. Therefore, a cross sectional shape of cantilevers composed of the polymer actuator elements 531 and 532 and the connecting members 551A, 551B, 552A, and 552B can form an S-shaped curve. The connection section 54A can thereby be translated in the Z axis direction, and the holding member 54B (and the lens 40) is driven in the Z axis direction while maintained parallel to the support member 51. For example, a spring constant can be used for the above-described stiffness (flexural rigidity).

(Operation of Camera Module 4)

Figure 12A:
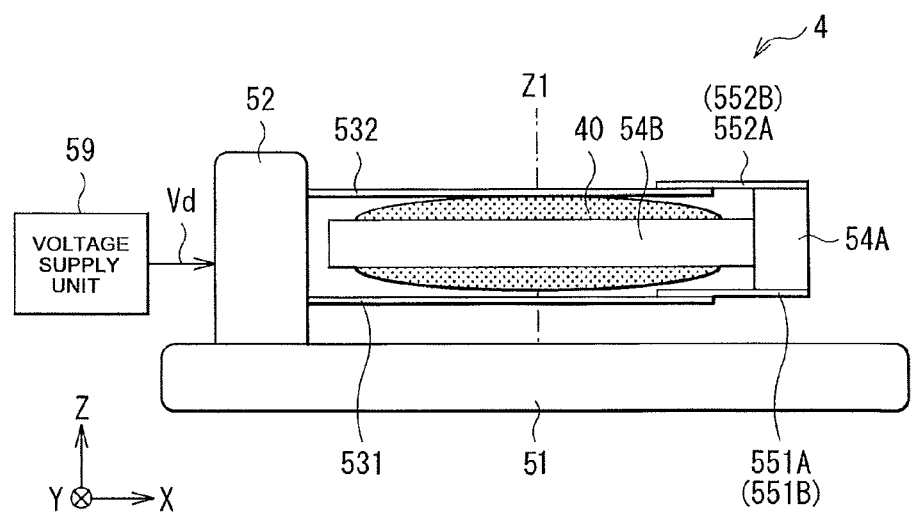
FIG. 12A is a schematic side view illustrating the non-operating state of the camera module shown in FIG. 10.
Figure 12B:
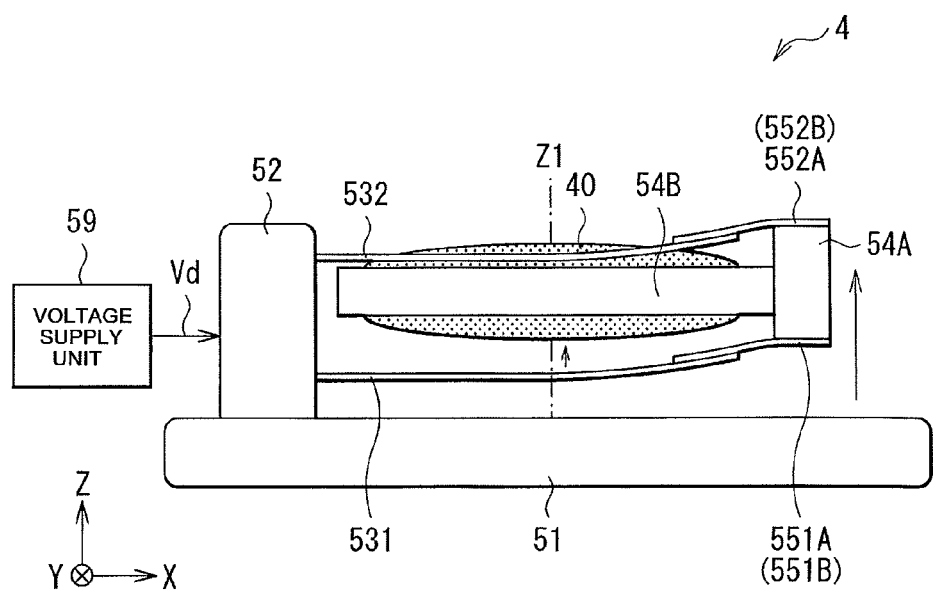
FIG. 12B is a schematic side view illustrating the operating state of the camera module shown in FIG. 12A.

FIGS. 12A and 12B illustrate diagrammatic side views (Z-X side views) of an exemplary schematic configuration of the camera module 4. FIG. 12A shows a non-operating state, and FIG. 12B shows an operating state.

In this camera module 4, when the driving voltage Vd is supplied from the voltage supply unit 59 to the polymer actuator elements 531 and 532, the other ends of the polymer actuator elements 531 and 532 are bent in the Z axis direction on the above-described principle. Therefore, the polymer actuator elements 531 and 532 drive the lens holding member 54, so that the lens 40 can move along the optical axis Z1 (see arrows in FIG. 12B). As described above, in the camera module 4, the driving unit (lens driving unit) using the polymer actuator elements 531 and 532 drives the lens 40 along the optical axis Z1. Specifically, the lens 40 in the camera module 4 moves along the optical axis Z1 to achieve focusing and zooming.

Application Example 2

Next, an imaging device (camera module) according to application example 2 of the polymer elements in the above embodiment etc. will be described. The imaging device according to this application example is also built in, for example, the mobile phone 8 having an imaging function as shown in FIGS. 8 and 9 above. Although the imaging device 2 in application example 1 uses polymer elements (the polymer actuator elements) as the lens driving unit, the imaging device in this application example uses a polymer element as a driving unit for driving an imaging element 3, as described later.

(Configuration of Imaging Device 2A)

Figure 13:
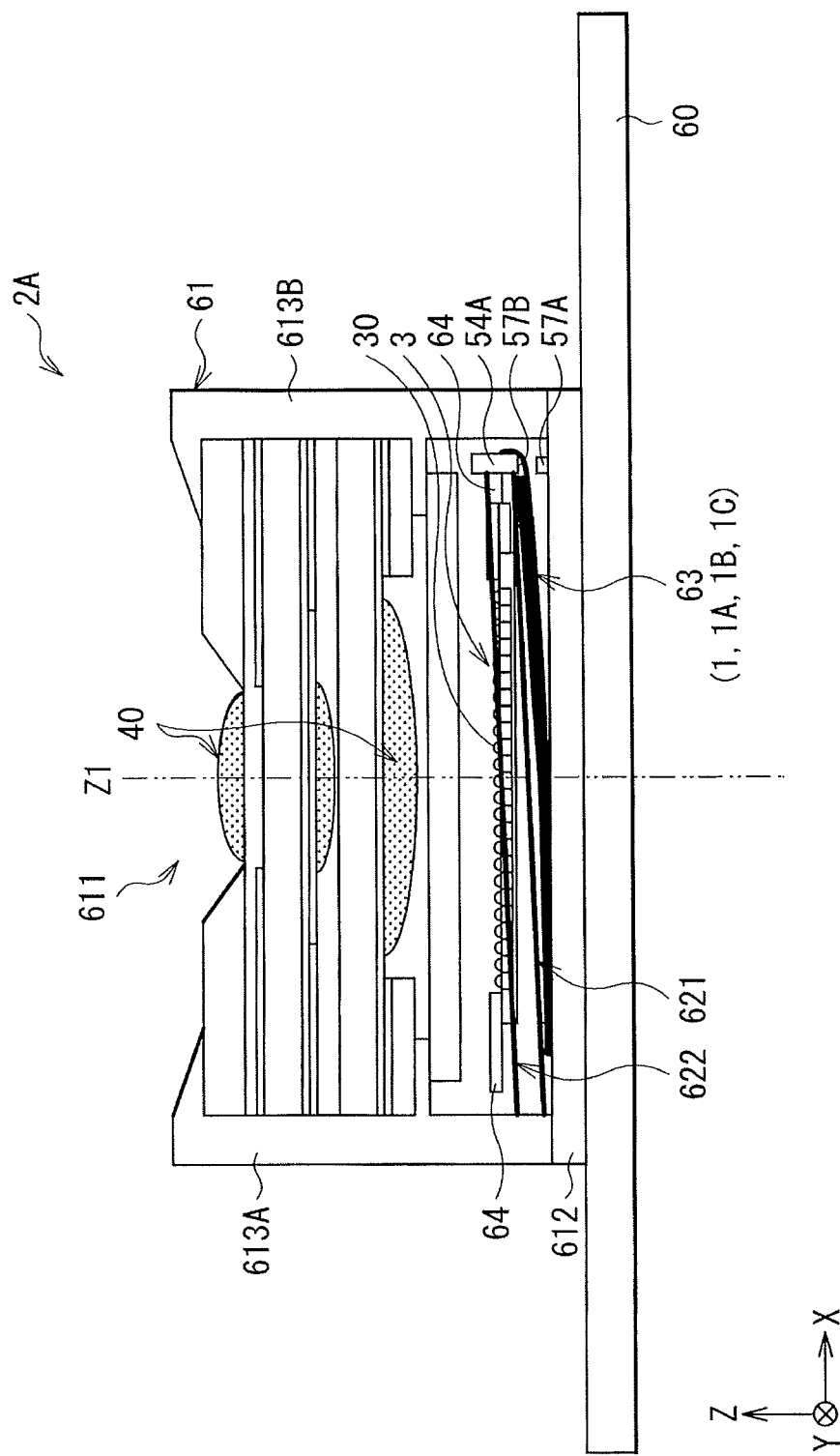
FIG. 13 is a cross-sectional view illustrating another example of the imaging device shown in FIG. 9.

FIG. 13 illustrates a side view (a Z-X side view) of an exemplary schematic configuration of the imaging device (the imaging device 2A) according to this application example. The imaging device 2A has a housing 61 for holding various components on a substrate 60.

An opening 611 for disposing the lens 40 therein is formed in the housing 61, and the housing 61 includes a pair of side wall portions 613A and 613B and a bottom portion 612 located on the substrate 60. One ends of a pair of flat springs 621 and 622 are secured to the side wall portion 613A, and the imaging element 3 is disposed at the other ends of the flat springs 621 and 622 through a connection member 54A and a support member 64. One end of a polymer actuator element 63 is secured to the bottom portion 612, and the other end of the polymer actuator element 63 is secured to a bottom surface of the support member 64. A Hall element 57A is also disposed on the bottom portion 612, and a Hall element 57B is disposed on the connection member 54A at a position facing the Hall element 57A.

Among these components of the imaging device 2A, the bottom portion 612, the side wall portion 613A, the flat springs 621 and 622, the polymer actuator element 63, the support member 64, and the connection member 54A mainly correspond to one specific example of a "driving unit for driving an imaging element" (an imaging element driving unit) in the present technique.

As described above, the polymer actuator element 63 is used to drive the imaging element 3 and constituted by using any of the polymer elements 1, 1A, 1B, and 1C according to the above embodiment etc.

(Operation of Imaging Device 2A)

Figure 14A:
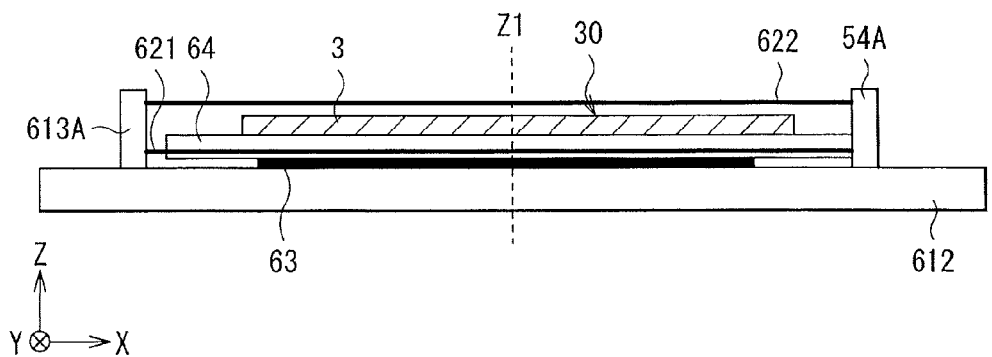
FIG. 14A is a schematic side view illustrating the non-operating state of the imaging device shown in FIG. 13.
Figure 14B:
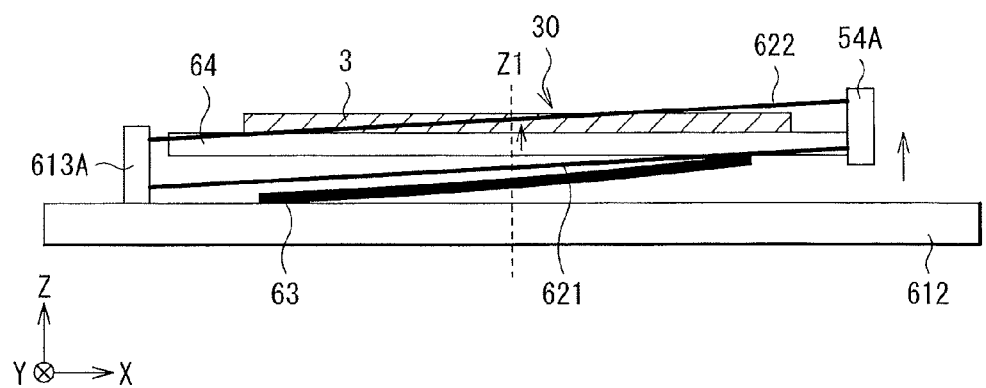
FIG. 14B is a schematic side view illustrating the operating state of the imaging device shown in FIG. 14A.

FIGS. 14A and 14B illustrate schematic side views (Z-X side views) of part (the above-described imaging element driving unit) of the imaging device 2A. FIG. 14A shows a non-operating state, and FIG. 14B shows an operating state.

In this imaging device 2A, when a driving voltage Vd is supplied from a voltage supply unit (not shown) to the polymer actuator element 63, the other end of the polymer actuator element 63 is bent in the Z axis direction on the above-described principle. Therefore, the polymer actuator element 63 drives the connection member 54A, so that the imaging element 3 can move along the optical axis Z1 of the lens 40 (see arrows in FIG. 14B). As described above, in the imaging device 2A, the driving unit (imaging element driving unit) using the polymer actuator element 63 drives the imaging element 3 along the optical axis Z1 of the lens 40. The relative distance between the lens 40 and the imaging element 3 is thereby changed, so that focusing and zooming are achieved.

Other Application Examples

Figure 15A:
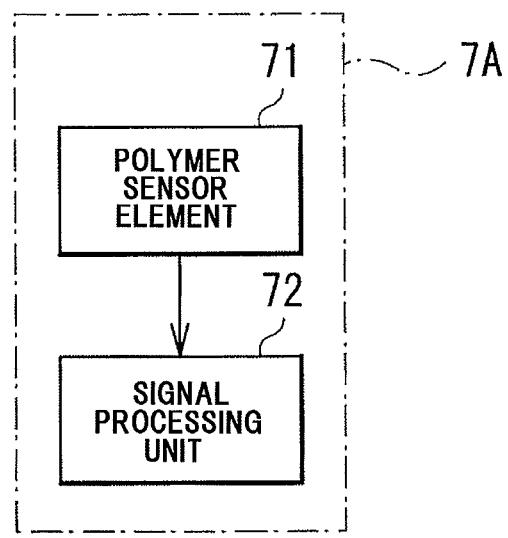
FIG. 15A is a schematic diagram illustrating an exemplary configuration of an electronic device to which the polymer element shown in FIG. 1 etc. is applied.
Figure 15B:
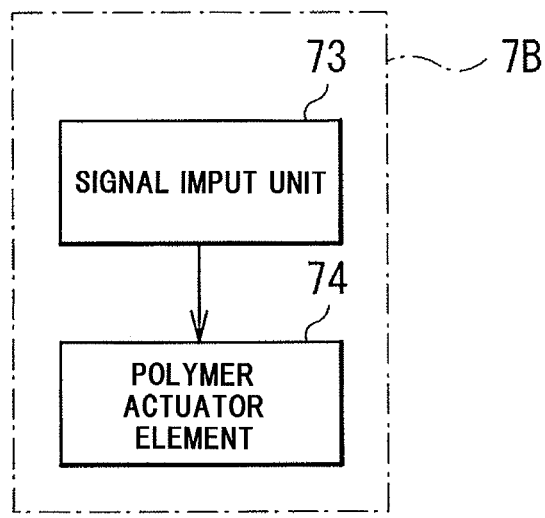
FIG. 15B is a schematic diagram illustrating another example of the electronic device shown in FIG. 15A.

FIGS. 15A and 15B schematically illustrate exemplary configurations of electronic devices (electronic devices 7A and 7B) according to other application examples.

The electronic device 7A (FIG. 15A) includes a polymer sensor element 71 and a signal processing unit 72. In this electronic device 7A, a signal detected as a result of deformation of the polymer sensor element 71 is input to the signal processing unit 72 and subjected to various types of signal processing. Examples of such an electronic device 7A may include a pulse sensor for detecting expansion and contraction of a blood vessel, a touch sensor for detecting the contact position of, for example, a finger and the contact strength, a bend sensor for detecting the state of bending when, for example, pages of a book etc. are turned, and a motion sensor for detecting, for example, the motion of a joint of a human.

The electronic device 7B (FIG. 15B) includes a signal input unit 73 and a polymer actuator element 74. In this electronic device 7B, the polymer actuator element 74 deforms in response to a signal from the signal input unit 73. Examples of such an electronic device 7B may include a catheter.

<Other Modifications>

The technique of the present technique has been described by way of the embodiment, the modifications, and the application examples. However, the present technique is not limited to these embodiment etc., and various modifications are possible. For example, the shapes, materials, etc. of the polymer elements and other components in the imaging device are not limited to those described in the above embodiment etc., and the stacking structures of the polymer elements are not limited to those described in the above embodiment etc. and can be appropriately changed.

In the above application examples, the polymer actuator elements and the polymer sensor element applied to electronic devices have been described as examples. However, the polymer element functioning as an electric double layer capacitor and the polymer element functioning as a secondary battery (the polymer element 1D in FIG. 7) may be applied to electronic devices.

In addition, in the description in modification 4 above, the negative electrode 22B of the polymer element 1D contains the carbon particles and also the electrically conductive substance. However, the positive electrode may contain the carbon particles and also the electrically conductive substance. In the description of modification 4, the present technique is applied to the secondary battery. The present technique is also applicable to a primary battery.

In the above embodiment etc., the lens driving unit that drives the lens, which is a driving object, along its optical axis has been mainly described as an example of the driving unit of the present technique, but this is not a limitation. For example, the lens driving unit may drive the lens in a direction orthogonal to the optical axis. The driving unit of the present technique is also applicable to, in addition to the above lens driving unit and the imaging element driving unit, driving units for driving other driving objects such as a diaphragm (see Japanese Patent Application Laid-Open No. 2008-259381) and image stabilization unit. The driving unit, camera module, and imaging device of the present technique are applicable to, in addition to the mobile phone described in the above embodiment, various electronic devices.

The effects described in the present description are merely examples and are not intended to be limitative, and other effects may be achieved.

The present technique can also be configured as follows.

(1) An ion conductive film including an ion conductive macromolecular material, a carbon material, and an electrically conductive material different from the carbon material.

(2) The ion conductive film according to (1), wherein the carbon material is carbon particles, and the electrically conductive material is present in spaces between the carbon particles.

(3) The ion conductive film according to (1) or (2), wherein an electric resistivity of the electrically conductive material is lower than an electric resistivity of the carbon material.

(4) The ion conductive film according to any one of (1) to (3), wherein the electrically conductive material is a metal material.

(5) The ion conductive film according to any one of (1) to (4), wherein the electrically conductive material is gold or platinum.

(6) The ion conductive film according to any one of (1) to (5), wherein the electrically conductive material has a fibrous shape.

(7) The ion conductive film according to any one of (1) to (5), wherein the electrically conductive material has a granular shape.

(8) The ion conductive film according to (2), wherein the electrically conductive material is shaped into a film form so as to cover surfaces of the carbon particles.

(9) The ion conductive film according to (6), wherein the ion conductive film is formed into a rectangular shape having long sides and short sides, and the electrically conductive material extends in a direction crossing the long sides.

(10) The ion conductive film according to (6), wherein the electrically conductive material extends in a thickness direction of the ion conductive film.

(11) A polymer element including a pair of electrode layers and a macromolecular layer between the pair of electrode layers, wherein at least one of the pair of electrode layers contains an ion conductive macromolecular material, a carbon material, and an electrically conductive material different from the carbon material.

(12) The polymer element according to (11), wherein a metal layer is provided on each of surfaces of the pair of electrode layers, the surfaces being opposite to the macromolecular layer.

(13) The polymer element according to (11), wherein one end of the polymer element is fixed, and the other end of the polymer element undergoes displacement with respect to the one end, and a concentration of the electrically conductive material is higher at the one end than at the other end.

(14) The polymer element according to any one of (11) to (13), configured as a polymer actuator element.

(15) The polymer element according to any one of (11) to (13), configured as a polymer sensor element.

(16) The polymer element according to (11) or (12), configured as an electric double layer capacitor.

(17) The polymer element according to (11) or (12), configured as a battery.

(18) An electronic device including a polymer element having a pair of electrode layers and a macromolecular layer between the pair of electrode layers, wherein at least one of the pair of electrode layers contains an ion conductive macromolecular material, a carbon material, and an electrically conductive material different from the carbon material.

(19) A camera module including a lens and a driving unit that is configured using a polymer element and drives the lens, wherein the polymer element includes a pair of electrode layers and a macromolecular layer between the pair of electrode layers, and at least one of the pair of electrode layers contains an ion conductive macromolecular material, a carbon material, and an electrically conductive material different from the carbon material.

(20) An imaging device including a lens, an imaging element that acquires an imaging signal of an image formed through the lens, and a driving unit that is configured using a polymer element and drives the lens or the imaging element, wherein the polymer element includes a pair of electrode layers and a macromolecular layer between the pair of electrode layers, and at least one of the pair of electrode layers contains an ion conductive macromolecular material, a carbon material, and an electrically conductive material different from the carbon material.

The present application claims priority from Japanese Patent Application No. 2013-249052 filed with the Japanese Patent Office on Dec. 2, 2013, and the entire contents of Japanese Patent Application No. 2013-249052 are incorporated by reference in this application.

It should be understood that those skilled in the art can arrive at various modifications, combinations, sub-combinations, and alterations according to design requirements and other factors but these modifications, combinations, sub-combinations, and alterations are within the scope of the appended claims and the equivalents thereof.

The invention claimed is:

1. An ion conductive film comprising:
a single layer that includes:
an ion conductive macromolecular material;
a carbon material; and
an electrically conductive material different from the carbon material, wherein the ion conductive macromolecular material, the carbon material and the electrically conductive material different from the carbon material are intermixed.

2. The ion conductive film according to claim 1, wherein the carbon material is carbon particles, and
the electrically conductive material is present in spaces between the carbon particles.

3. The ion conductive film according to claim 1, wherein an electric resistivity of the electrically conductive material is lower than an electric resistivity of the carbon material.

4. The ion conductive film according to claim 1, wherein the electrically conductive material is a metal material.

5. The ion conductive film according to claim 1, wherein the electrically conductive material is gold or platinum.

6. The ion conductive film according to claim 1, wherein the electrically conductive material has a fibrous shape.

7. The ion conductive film according to claim 1, wherein the electrically conductive material has a granular shape.

8. The ion conductive film according to claim 2, wherein the electrically conductive material is shaped into a film form so as to cover surfaces of the carbon particles.

9. The ion conductive film according to claim 6, wherein the ion conductive film is formed into a rectangular shape having long sides and short sides, and
the electrically conductive material extends in a direction crossing the long sides.

10. The ion conductive film according to claim 6, wherein the electrically conductive material extends in a thickness direction of the ion conductive film.

11. A polymer element comprising:
a pair of electrode layers; and
a macromolecular layer between the pair of electrode layers, wherein
at least one of the pair of electrode layers contains a single layer that includes:
an ion conductive macromolecular material,
a carbon material, and
an electrically conductive material different from the carbon material, wherein the ion conductive macromolecular material, the carbon material and the electrically conductive material different from the carbon material are intermixed.

12. The polymer element according to claim 11, wherein a metal layer is provided on each of surfaces of the pair of electrode layers, the surfaces being opposite to the macromolecular layer.

13. The polymer element according to claim 11, wherein
one end of the polymer element is fixed, and the other end of the polymer element undergoes displacement with respect to the one end, and
a concentration of the electrically conductive material is higher at the one end than at the other end.

14. The polymer element according to claim 11, configured as a polymer actuator element.

15. The polymer element according to claim 11, configured as a polymer sensor element.

16. The polymer element according to claim 11, configured as an electric double layer capacitor.

17. The polymer element according to claim 11, configured as a battery.

18. An electronic device comprising a polymer element having a pair of electrode layers and a macromolecular layer between the pair of electrode layers, wherein
at least one of the pair of electrode layers contains a single layer that includes:
an ion conductive macromolecular material,
a carbon material, and
an electrically conductive material different from the carbon material, wherein the ion conductive macromolecular material, the carbon material and the electrically conductive material different from the carbon material are intermixed.

19. A camera module comprising:
a lens; and
a driving unit that is configured using a polymer element and drives the lens, wherein the polymer element includes
a pair of electrode layers, and
a macromolecular layer between the pair of electrode layers, and
at least one of the pair of electrode layers contains a single layer that includes:
an ion conductive macromolecular material,
a carbon material, and
an electrically conductive material different from the carbon material, wherein the ion conductive macromolecular material, the carbon material and the electrically conductive material different from the carbon material are intermixed.

20. An imaging device comprising:
a lens;
an imaging element that acquires an imaging signal of an image formed through the lens; and
a driving unit that is configured using a polymer element and drives the lens or the imaging element, wherein the polymer element includes
    a pair of electrode layers, and
    a macromolecular layer between the pair of electrode layers, and
at least one of the pair of electrode layers contains a single layer that includes:
    an ion conductive macromolecular material,
    a carbon material, and
    an electrically conductive material different from the carbon material, wherein the ion conductive macromolecular material, the carbon material and the electrically conductive material different from the carbon material are intermixed.

* * * * *